(12) United States Patent
Chen et al.

(10) Patent No.: US 8,442,994 B1
(45) Date of Patent: May 14, 2013

(54) CUSTOM SEARCH INDEX DATA SECURITY

(75) Inventors: Johnny Chen, Mountain View, CA (US);
Naval Verma, Sunnyvale, CA (US);
Clarence Christopher Mysen, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 836 days.

(21) Appl. No.: 12/209,996

(22) Filed: Sep. 12, 2008

Related U.S. Application Data

(60) Provisional application No. 60/972,511, filed on Sep. 14, 2007.

(51) Int. Cl.
*G06F 17/30* (2006.01)

(52) U.S. Cl.
USPC .......................................... 707/781; 707/711

(58) Field of Classification Search ............... 707/710, 707/711, 758, 999.001, 999.003
See application file for complete search history.

(56) References Cited

U.S. PATENT DOCUMENTS

| | | | |
|---|---|---|---|
| 6,081,829 A | 6/2000 | Sidana | |
| 2002/0120564 A1 | 8/2002 | Striezel | |
| 2002/0147704 A1* | 10/2002 | Borchers | 707/3 |
| 2004/0143580 A1 | 7/2004 | Chi et al. | |
| 2004/0220926 A1 | 11/2004 | Lamkin et al. | |
| 2005/0120233 A1* | 6/2005 | Halcrow et al. | 713/193 |
| 2005/0132067 A1 | 6/2005 | Bennett et al. | |
| 2005/0246651 A1 | 11/2005 | Krzanowski | |
| 2005/0256866 A1 | 11/2005 | Lu et al. | |
| 2006/0101285 A1* | 5/2006 | Chen et al. | 713/193 |
| 2006/0271524 A1 | 11/2006 | Tanne et al. | |
| 2007/0027866 A1* | 2/2007 | Schmidt-Karaca | 707/6 |
| 2007/0124283 A1 | 5/2007 | Gotts et al. | |
| 2007/0168331 A1 | 7/2007 | Reddy et al. | |
| 2007/0203891 A1 | 8/2007 | Solaro et al. | |
| 2007/0204232 A1 | 8/2007 | Ray et al. | |
| 2007/0288473 A1 | 12/2007 | Mukherjee et al. | |
| 2008/0049971 A1* | 2/2008 | Ramos et al. | 382/100 |
| 2008/0077579 A1 | 3/2008 | Ozveren et al. | |
| 2008/0115227 A1* | 5/2008 | Toutonghi | 726/29 |
| 2008/0168048 A1 | 7/2008 | Bell et al. | |

OTHER PUBLICATIONS

"Yahoo Search Subscriptions Brings Premium Content Into Web Search"; http://blog.searchenginewatch.com; Jun. 16, 2005 (print date); 4 pages.
U.S. Appl. No. 11/618,327, filed Dec. 29, 2006 entitled "Custom Search Index", by Johnny Chen et al.; 36 pages + 13 pages of drawings.

(Continued)

*Primary Examiner* — Syed Hasan
(74) *Attorney, Agent, or Firm* — Fish & Richardson P.C.

(57) ABSTRACT

A system includes a server to store content and a content searching system. The content search system includes an application programming interface to receive user-selected metadata uploaded from a first user, where the metadata includes data that describes content stored at a server. The content searching system further includes an indexer to index the metadata to produce a metadata search index, a search engine to search the metadata search index based on a search query received from a user to produce metadata search results, and a delivery engine to send the metadata search results, and a link to the remote server, to the user to permit the user to access the content stored at the remote server.

20 Claims, 23 Drawing Sheets

OTHER PUBLICATIONS

U.S. Appl. No. 11/618,321, filed Dec. 29, 2006 entitled Ranking Custom Search Results, by Clarence C. Mysen et al.; 37 pages + 17 pages of drawings.

U.S. Appl. No. 11/618,461, filed Dec. 29, 2006 entitled "Custom Search", by Clarence C. Mysen et al.; 41 pages + 22 pages of drawings.

U.S. Appl. No. 11/618,463, filed Dec. 29, 2006 entitled "Custom Content Provisioning", by Clarence C. Mysen et al.; 47 pages + 17 pages of drawings.

U.S. Appl. No. 11/618,391, filed Dec. 29, 2006 entitled "Custom Content and Advertising", by Clarence C. Mysen et al.; 28 pages + 10 pages of drawings.

U.S. Appl. No. 11/749,561, filed May 16, 2007 entitled "Duplicate Content Search", by Clarence C. Mysen et al.; 39 pages + 9 pages of drawings.

* cited by examiner

CUSTOM SEARCH INDEX DATA SECURITY

CROSS REFERENCE TO RELATED APPLICATION

The instant application claims priority from provisional application No. 60/972,511, filed Sep. 14, 2007, the disclosure of which is incorporated by reference herein in its entirety.

BACKGROUND INFORMATION

The World Wide Web ("web") contains a vast amount of information. Locating a desired portion of the information, however, can be challenging. This problem is compounded because the amount of information on the web and the number of new users inexperienced at web searching are growing rapidly. Search engines assist users in locating desired portions of this information by cataloging web pages. Typically, in response to a user's request, the search engine returns references to documents relevant to the request.

A web crawler is typically used to find and retrieve documents (e.g., web pages) on the web. To retrieve a document from the web, the web crawler sends a request to, for example, a web server for a document, downloads the entire document, and then provides the document to an indexer. The indexer typically takes the text of the crawled document, extracts individual terms from the text and sorts those terms (e.g., alphabetically) into a search index. The web crawler and indexer repeat this process as the web crawler crawls documents across the web. Each entry in the search index contains a term stored in association with a list of documents in which the term appears and the location within the document where the term appears. The search index, thus, permits rapid access to documents that contain terms that match search terms of a user supplied search query. To improve search performance, the indexer typically ignores common words, called stop words (e.g., the, is, on, or, of, how, why, etc.) when creating or updating the search index. Existing indexers create a single search index that contains terms extracted from all documents crawled on the web.

SUMMARY

According to one aspect, a method may include receiving first custom content associated with a first user, where the first custom content includes data that is uploaded by the first user via an application programming interface or includes data that is designated by the first user from a set of documents. The method may further include indexing the first custom content to produce a first custom search index, receiving a search query from a second user and searching the first custom search index based on the search query to produce first custom search results. The method may also include encrypting the first custom search results and providing the encrypted first custom search results to the second user.

According to another aspect, a method may include receiving user-selected metadata uploaded from a first user, where the metadata includes data that describes other data stored at a server. The method may further include indexing the metadata to produce a metadata search index, receiving a search query from a second user and searching the metadata search index based on the search query to produce metadata search results. The method may also include sending the metadata search results, and a link to the server, to the second user to permit the second user to access the other data stored at the server.

According to a further aspect, a method may include receiving metadata and associated encrypted content, where the metadata includes data that describes the encrypted content. The method may further include indexing the metadata to produce a metadata search index, receiving a search query from a user and searching the metadata search index based on the search query to produce metadata search results. The method may also include sending the metadata search results to the user, receiving selection of a result from the metadata search results and sending the encrypted content to the user.

According to an additional aspect, a system may include a database to store encrypted content and a search index that indexes metadata that includes data that describes the encrypted content. The system may further include a content searching unit to search the search index to produce metadata search results. The system may also include a delivery engine to send the metadata search results to a user, and send a portion of the encrypted content to the user based on user selection of a result from the metadata search results.

According to yet another aspect, a system may include a server to store content and a content searching system. The content searching system may include an application programming interface to receive user-selected metadata uploaded from a first user, where the metadata includes data that describes content stored at a server. The content searching system may further include an indexer to index the metadata to produce a metadata search index, a search engine to search the metadata search index based on a search query received from a user to produce metadata search results, and a delivery engine to send the metadata search results, and a link to the remote server, to the user to permit the user to access the content stored at the remote server.

According to an additional aspect, a system may include a first indexer to index first content uploaded from a first user to produce a first index and a second indexer to index second content uploaded from a second user to produce a second index. The system may further include one or more search engines to receive a search query from a third user, and search the first index and/or the second index based on the search query to produce first search results. The system may also include a security unit to encrypt the first search results for supplying the encrypted first search results to the third user.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Figure 1A:
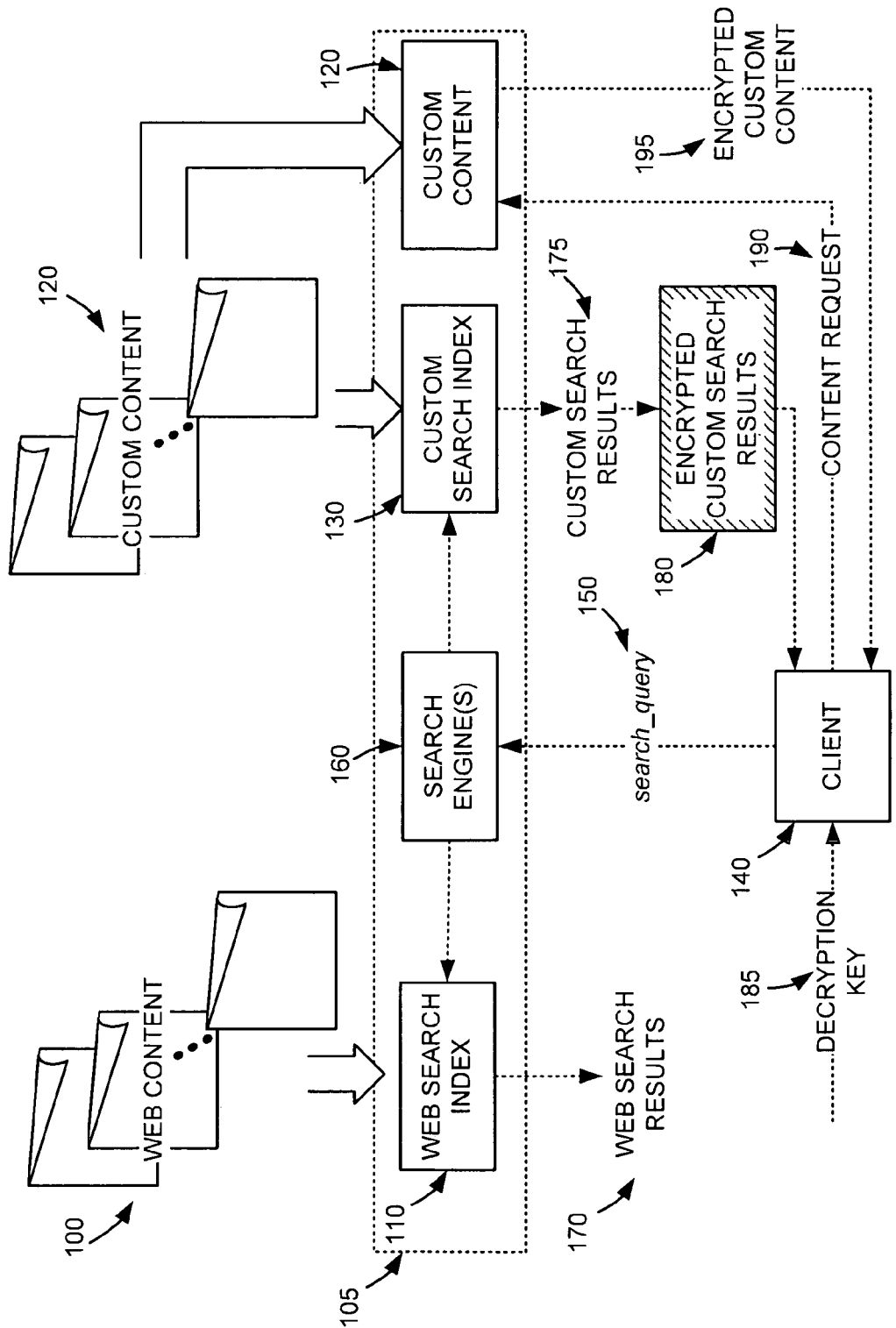
FIGS. 1A, 1B, 2A and 2B are diagrams of overviews of exemplary implementations described herein.

The following detailed description refers to the accompanying drawings. The same reference numbers in different drawings may identify the same or similar elements. Also, the following detailed description does not limit the invention.

Implementations described herein may permit a user to create their own corpora of customized content that may be accessed and searched by other users via a content searching service, such as, for example, Google Search. A content searching system may crawl the web to retrieve web content and then index the retrieved web content to create a web search index. A user may also upload or otherwise identify custom content to the content searching system, which may then index the custom content to create a custom search index that is different than the web search index. Other users may also upload their own custom content to the content searching system, which may then be indexed to create different respective custom search indexes that are separate and distinct from the web search index and other custom search indexes.

Searching of custom content using the different custom search indexes may then be selectively permitted by users who may or may not have to be authenticated for the custom content that they wish to access (e.g., search). For example, the custom search index may store information different from the information stored by the web search index. In one implementation, the custom search index may store a subset of the information stored in the web search index. In this case, it may be possible for the custom search index to store pointers to information in the web search index. Alternatively, or additionally, the custom search index may store information that is not present in the web search index. Also, the custom search index may be considered different from the web search index in the sense that the custom search index may be searchable separate from the web search index.

Various data security techniques, as described herein, may be used to protect custom content from unauthorized access. Such security techniques may include, for example, encrypting results of a search of custom content such that only authenticated users may decrypt the encrypted search results and associated custom content. Such security techniques may further include the storage, indexing and searching of metadata that describes custom content that is stored at a data server that may be remote from the content searching system. A searching user may, after searching the metadata to identify custom content of interest, obtain the custom content via secure access to the data server. The data security techniques may further include the storage, indexing and searching of metadata that describes custom content that is encrypted and stored at the content searching system. A searching user may, after searching the metadata to identify custom content of interest, obtain a decryption key from a data server, that may be remote from the content searching system, and may use the obtained decryption key to decrypt encrypted custom content stored at the content searching system.

"Content," as the term is used herein, is to be broadly interpreted to include data that may or may not be in document form. Examples of content may include data associated with a document or data in a database. "Metadata," as the term is used herein, is to be broadly interpreted as a type of data that describes other data (e.g., describes content). "Metadata," thus, is data that describes characteristics of other data (e.g., what the other data represents, the other data's quality or condition, etc.).

A "document," as the term is used herein, is to be broadly interpreted to include any machine-readable and machine-storable work product. A document may include, for example, an e-mail, an image, video, a website, a business listing, a file, a combination of files, one or more files with embedded links to other files, a news group posting, a blog, a web advertisement, a digital map, etc. In the context of the Internet, a common document is a web page. Documents often include textual information and may include embedded information (such as meta information, images, hyperlinks, etc.) and/or embedded instructions (such as Javascript, etc.).

"Custom content," as the term is used herein, is to be broadly interpreted to include content that has been uploaded by a user for indexing, content identified (i.e., directly or indirectly) by a user for indexing and/or web content that is available only to selected subscribers via subscription. A "user," as that term is used here, is to be broadly interpreted to include one or more people (e.g., a person, a group of people that may have some relationship (e.g., people associated with a business or organization), or a group of people with no formal relationship).

A "link," as the term is used herein, is to be broadly interpreted to include any reference to/from a document from/to another document or another part of the same document. A "site" as the term is used herein is to be broadly interpreted to include a group of documents hosted by any type of entity. A "site" may include a group of documents under common control, such as a group of documents associated with an organization, a domain name, a host name, or a set of documents created by the same person or group of persons. A "site" may also include a group of documents about a particular topic, a group of documents in a particular language, a group of documents hosted in a particular country, or a group of documents written in a particular writing style.

OVERVIEW

FIG. 1A is a diagram of an overview of a first exemplary implementation described herein in which custom content is provided to a content searching system and the content searching system encrypts results of a search of the custom content prior to sending the search results to a client and further encrypts custom content requested by the client prior to sending the custom content to the client. Thus, in the exemplary implementation of FIG. 1A, content searching system 105 is considered to be "trusted" and the custom content is provided to the content searching system for indexing and storage in an unencrypted form. As shown in FIG. 1A, web content 100 may be retrieved using, for example, a web crawler (not shown). The web crawler may find and retrieve documents (e.g., web pages) stored on the web and extract content from the documents. For example, the web crawler may send a request to a web server for a document, download the entire document, and then provide the document to an indexer (not shown). The indexer may then index the retrieved web content to create a web search index 110 of a content searching system 105. The indexer may extract individual terms or other data from the crawled document and sort those terms or other data (e.g., alphabetically) into web search index 110. Other techniques for extracting and indexing content, that are more complex than simple word-level indexing, may also be used, including techniques for indexing extensible markup language (XML) data, image data, video data, audio date, etc.

Each entry in web search index 110 may contain a term or other data stored in association with a list of documents in which the term or other data appears and the location within the document where the term or other data appears. Web search index 110 may subsequently be used to search for specific documents whose content matches a search query 150.

As further shown in FIG. 1A, custom content 120 may also be obtained. Custom content 120 may include content uploaded by a user, content designated by the user as being part of its custom content (e.g., user designates one or more websites or web pages to be included in the user's custom content), web content that is available only to selected subscribers via subscription, or other types of content that may be aggregated and indexed separately from web search index 110 (e.g., the user may designate websites or web pages that contain content about a selected topic as being included in the user's custom content). An indexer (not shown) may index the obtained custom content to create a custom search index 130 of content searching system 105 that may be different from web search index 110 (e.g., custom search index 130 may include information different from web search index 110 and/or custom search index 130 may be searchable separate from web search index 110). The indexer may take the text or other data from custom content 120, extract individual terms or other data from custom content 120 and sort those terms or other data (e.g., alphabetically) into custom search index 130. Other techniques for extracting and indexing content, that are more complex than simple word-level indexing, may also be used, including techniques for indexing XML data, image data, video data, audio data, etc.

Each entry in custom search index 130 may contain a term or other data stored in association with a location within custom content 120 where the term or other data appears. Custom search index 130 may subsequently be used to search for specific content of custom content 120 that matches a search query 150. Custom search index 130 may include multiple custom search indexes (not shown), each being associated with a different corpus of custom content.

Search engine(s) 160 may receive search query 150 from a client 140 and may selectively search either of web search index 110 or custom search index 130 (or multiple different custom search indexes), or may search both of web search index 110 and custom search index 130 (or other different custom search indexes), using search query 150. A search of web search index 110 by search engine(s) 160 may return web search results 170 that match search query 150. A search of custom search index 130 by search engine(s) 160 may return custom search results 175 that match search query 150. Web search results 170 and custom search results 175 may be represented together or separately within a search result document, as will be described below.

Custom search results 175 may be encrypted to generate encrypted custom search results 180 and the encrypted custom search results 180 may be sent to client 140. Custom search results 175 may be encrypted using, for example, a symmetric encryption/decryption key. Client 140 may decrypt the encrypted custom search results 180 using the symmetric encryption/decryption key (e.g., a one key, single key or private key) and symmetric decryption techniques (e.g., Twofish, Serpent, AES, Blowfish, CAST5, RC4, IDEA). The encryption/decryption key 185 may be obtained by client 140 from a custom content server, that originally provided custom content 120 to content searching system 105, or from content searching system 105 itself. Upon receipt, client 140 may decrypt encrypted custom search results 180 to reproduce custom search results 175. Upon selection of one or more results from custom search results 175 by a user at client 140, client 140 may send a content request 190 to content searching system 105 requesting a specific portion(s) of custom content 120. In reply, content searching system 105 may retrieve the custom content corresponding to content request 190, encrypt the retrieved custom content using symmetric encryption/decryption key 185 to generate encrypted custom content 195, and may then send encrypted custom content 195 to client 140. Client 140 may decrypt encrypted custom content 195 using symmetric encryption/decryption key 185.

Figure 1B:
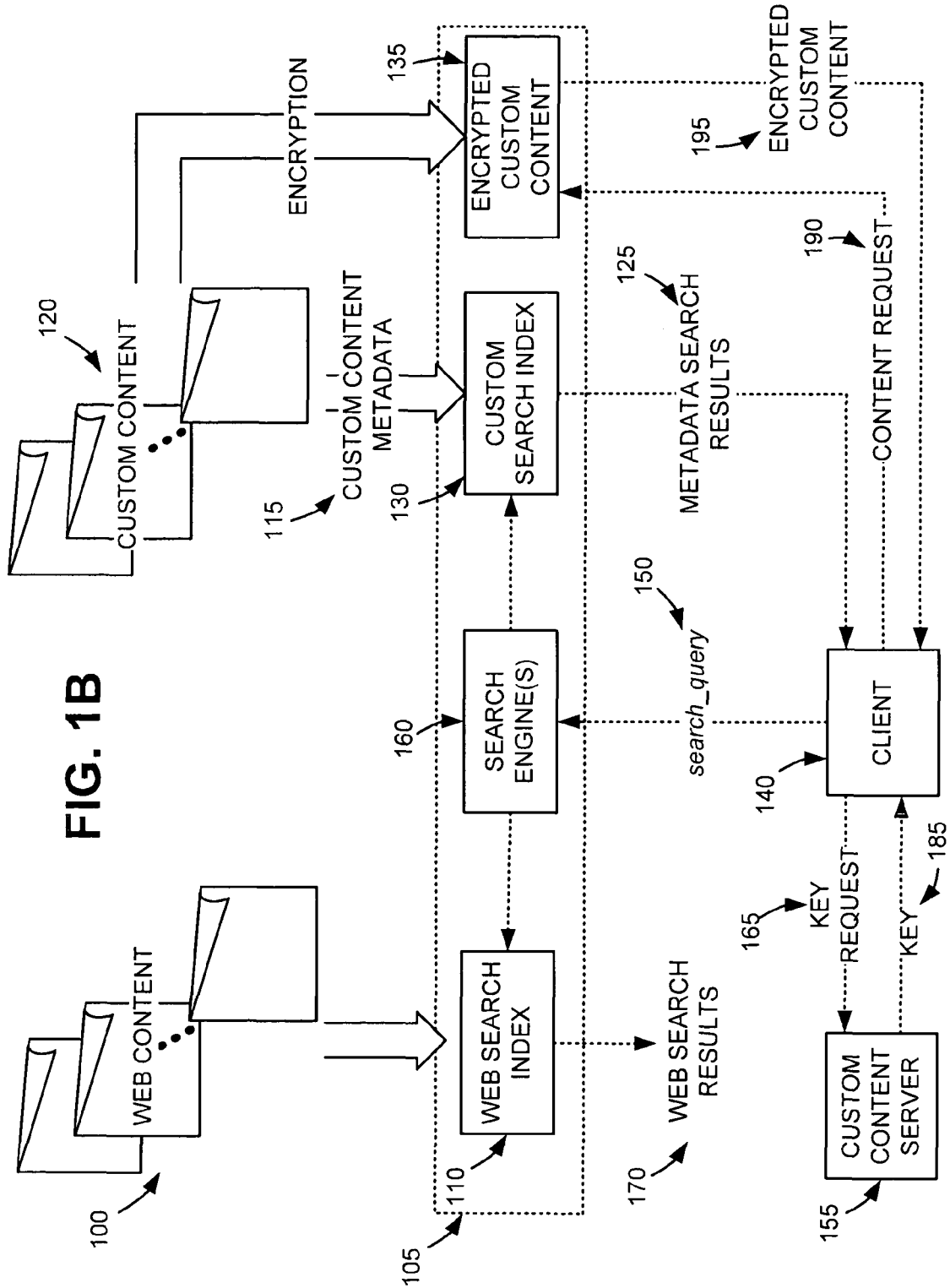

FIG. 1B is a diagram of an overview of another exemplary implementation described herein in which custom content metadata, that describes custom content 120, and corresponding encrypted custom content is provided to content searching system 105. The encrypted custom content may be pre-encrypted, prior to providing it to content searching system 105, by a custom content server 155 using, for example, a symmetric encryption/decryption key. Thus, in the exemplary implementation of FIG. 1B, content searching system 105 is considered to be "untrusted" and only custom content metadata, and not the custom content itself, is provided to content searching system for indexing and storage, and content searching system 105 may only receive and store encrypted custom content that corresponds to the custom content metadata.

As shown in FIG. 1B, web content 100 may be retrieved using, for example, a web crawler (not shown). The web crawler may find and retrieve documents (e.g., web pages) stored on the web and extract content from the documents. For example, the web crawler may send a request to a web server for a document, download the entire document, and then provide the document to an indexer (not shown). The indexer may then index the retrieved web content to create a web search index 110 of a content searching system 105. The indexer may extract individual terms or other data from the crawled document and sort those terms or other data (e.g., alphabetically) into web search index 110. Other techniques for extracting and indexing content, that are more complex than simple word-level indexing, may also be used, including techniques for indexing extensible markup language (XML) data, image data, video data, audio date, etc.

Each entry in web search index 110 may contain a term or other data stored in association with a list of documents in which the term or other data appears and the location within the document where the term or other data appears. Web search index 110 may subsequently be used to search for specific documents whose content matches a search query 150.

As further shown in FIG. 1B, custom content metadata 115 may also be obtained which may correspond to custom content 120. Custom content 120 may include data uploaded by a user, metadata designated by the user as being associated with its custom content (e.g., user designates one or more websites or web pages to be included in the user's custom content), metadata associated with web content that is available only to selected subscribers via subscription, or metadata associated with other types of content that may be aggregated and indexed separately from web search index 110 (e.g., the user may designate websites or web pages that contain content about a selected topic as being included in the user's custom content). Custom content metadata 115 may describe custom content 120. Custom content 120, corresponding to custom content metadata 115, may be encrypted and then provided to content searching system 105 as encrypted custom content 135. An indexer (not shown) may index the obtained custom content metadata to create a custom search index 130 of content searching system 105 that may be different from web search index 110 (e.g., custom search index 130 may include information different from web search index 110 and/or custom search index 130 may be searchable separate from web search index 110). The indexer may take the text or other data from custom content metadata 115, extract individual terms or other data from custom content metadata 115 and sort those terms or other data (e.g., alphabetically) into custom search index 130. Other techniques for extracting and indexing content, that are more complex than simple word-level indexing, may also be used, including techniques for indexing XML data, image data, video data, audio data, etc.

Each entry in custom search index 130 may contain a term or other data stored in association with a location within custom content metadata 115 where the term or other data appears. Custom search index 130 may subsequently be used to search for specific content of custom content metadata 115 that matches a search query 150. Custom search index 130 may include multiple custom search indexes (not shown), each being associated with a different corpus of custom content metadata.

Search engine(s) 160 may receive search query 150 from a client 140 and may selectively search either of web search index 110 or custom search index 130 (or multiple different custom search indexes), or may search both of web search index 110 and custom search index 130 (or other different custom search indexes), using search query 150. A search of web search index 110 by search engine(s) 160 may return web search results 170 that match search query 150. A search of custom search index 130 by search engine(s) 160 may return metadata search results 125 that match search query 150. Web search results 170 and metadata search results 125 may be represented together or separately within a search result document, as will be described below. Metadata search results 125 and web search results 170 may be sent to client 140. Upon selection of one or more results from metadata search results 125 by a user at client 140, client 140 may send a content request 190 to content searching system 105 requesting a specific portion(s) of encrypted custom content 135 that corresponds to a selected metadata search result(s) 125. In reply, content searching system 105 may retrieve portions of encrypted custom content 135 corresponding to content request 190 and may then send encrypted custom content 195 to client 140.

Client 140 may also send a key request 165 to custom content server 155. Custom content server 155, in response to the request, may send a decryption key 185 (e.g., a symmetric key) to client 140. Client 140 may subsequently decrypt encrypted custom content 195 using the received key 185. Custom content server 155 may have previously used key 185 to encrypt custom content 120 prior to providing encrypted custom content 135 to content searching system 105.

Figure 2A:
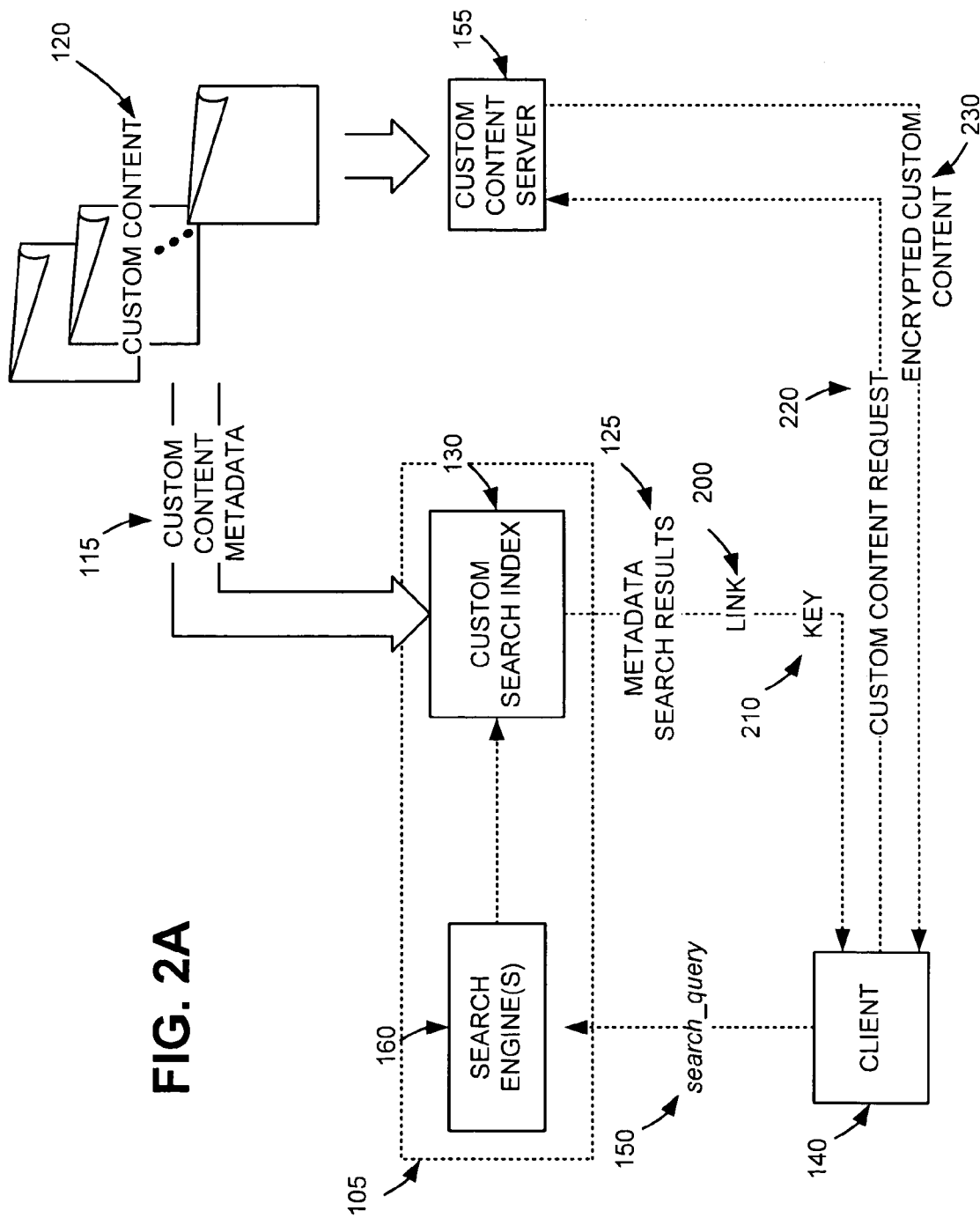

FIG. 2A is a diagram of an overview of a further exemplary implementation described herein in which metadata that describes custom content 120 is provided to content searching system 105, while custom content server 155 stores, and maintains control of, custom content 120. In the exemplary implementation of FIG. 2A, content searching system 105 supplies the decryption key to client 140 for decrypting encrypted custom content received from custom content server 155.

As shown in FIG. 2A, custom content 120 may be stored at custom content server 155. Custom content metadata 115, that includes data that describes custom content 120, may be provided to content searching system 105. An indexer (not shown) may index the provided custom content metadata to create a custom search index 130 that may be different from web search index 110 (not shown in FIG. 2A) (e.g., custom search index 130 may include information different from web search index 110 and/or custom search index 130 may be searchable separate from web search index 110) (not shown in FIG. 2A). The indexer may take the text or other data from custom content metadata 115, extract individual terms or other data from custom content metadata 115 and sort those terms or other data (e.g., alphabetically) into custom search index 130. Other techniques for extracting and indexing content, that are more complex than simple word-level indexing, may also be used, including techniques for indexing XML data, image data, video data, audio data, etc. Each entry in custom search index 130 may contain a term or other data stored in association with a location within custom content metadata 115 where the term or other data appears. Custom search index 130 may subsequently be used to search for specific content of custom content 120 that matches search query 150. Custom search index 130 may include multiple custom search indexes (not shown), each being associated with a different corpus of metadata custom content.

Search engine(s) 160 may receive search query 150 from a client 140 and may selectively search either of web search index 110 or custom search index 130 (or multiple different custom search indexes), or may search both of web search index 110 and custom search index 130 (or other different custom search indexes), using search query 150. A search of web search index 110 by search engine(s) 160 may return web search results 170 (not shown in FIG. 2A) that match search query 150. A search of custom search index 130 by search engine(s) 160 may return metadata search results 125 that match search query 150. Metadata search results 125, a link 200 to custom content server 220 and a key 210 may be provided to client 140. Key 210 may include a symmetric encryption/decryption key previously provided to content searching system 105 by custom content server 155. Client 140 may use the provided link 200 to send a custom content request 220 to custom content server 155. In response, custom content server 155 may send encrypted custom content 230 that corresponds to the content requested by the custom content request. Client 140, upon receipt of encrypted custom content 230, may decrypt it using key 210.

Figure 2B:
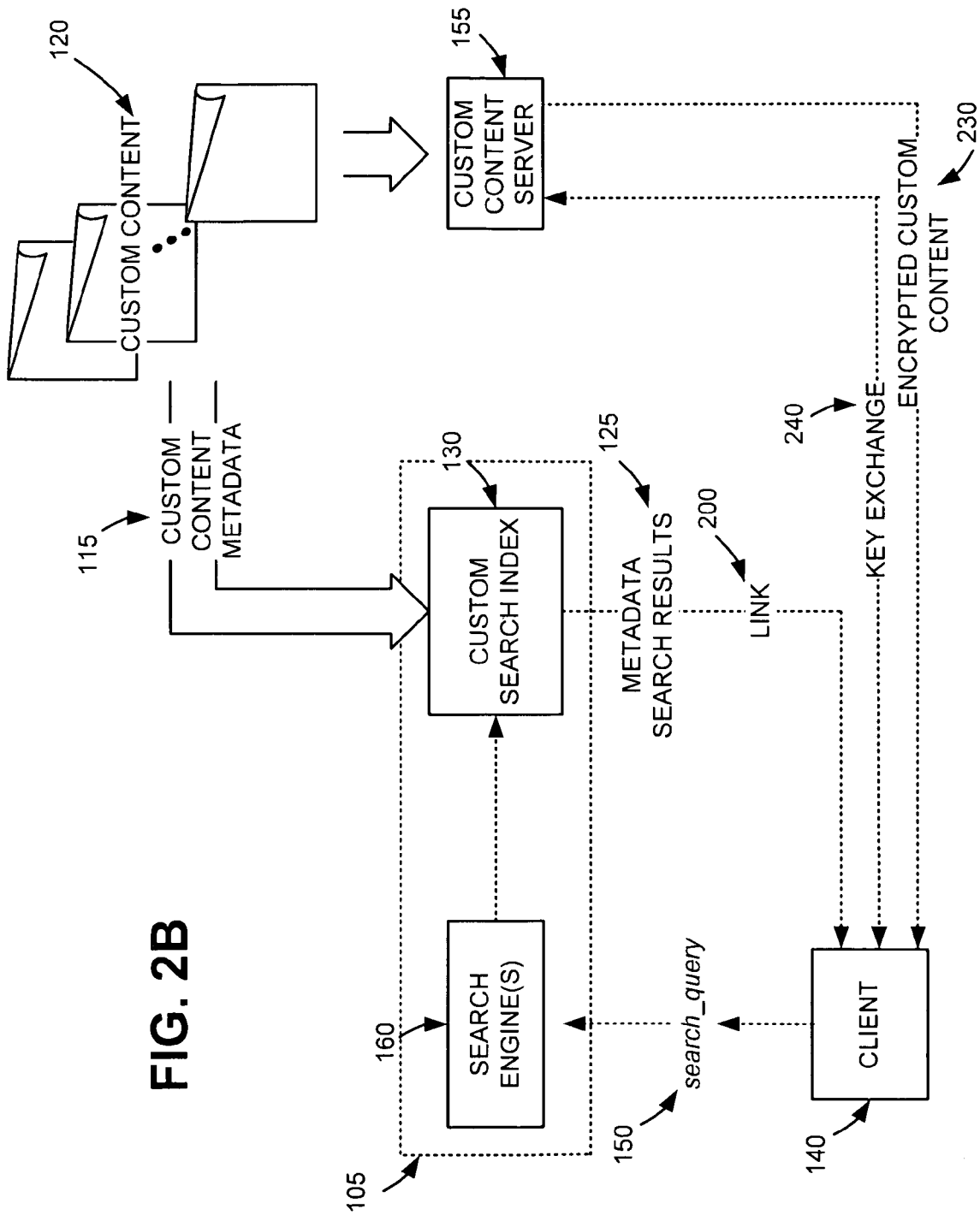

FIG. 2B is a diagram of an overview of another exemplary implementation described herein in which metadata that describes custom content 120 is provided to content searching system 105, while custom content server 155 stores, and maintains control of, custom content 120. In the exemplary implementation of FIG. 2B, custom content server 155 supplies the decryption key that client 140 may use to decrypt encrypted custom content.

As shown in FIG. 2B, custom content 120 may be stored at custom content server 155. Custom content metadata 115, that includes data that describes custom content 120, may be provided to content searching system 105. An indexer (not shown) may index the provided custom content metadata to create a custom search index 130 that may be different from web search index 110 (not shown in FIG. 2B) (e.g., custom search index 130 may include information different from web search index 110 and/or custom search index 130 may be searchable separate from web search index 110) (not shown in FIG. 2B). The indexer may take the text or other data from custom content metadata 115, extract individual terms or other data from custom content metadata 115 and sort those terms or other data (e.g., alphabetically) into custom search index 130. Other techniques for extracting and indexing content, that are more complex than simple word-level indexing, may also be used, including techniques for indexing XML data, image data, video data, audio data, etc. Each entry in custom search index 130 may contain a term or other data stored in association with a location within custom content metadata 115 where the term or other data appears. Custom search index 130 may subsequently be used to search for specific content of custom content 120 that matches search query 150. Custom search index 130 may include multiple custom search indexes (not shown), each being associated with a different corpus of metadata custom content.

Search engine(s) 160 may receive search query 150 from a client 140 and may selectively search either of web search index 110 or custom search index 130 (or multiple different custom search indexes), or may search both of web search index 110 and custom search index 130 (or other different custom search indexes), using search query 150. A search of web search index 110 by search engine(s) 160 may return web search results 170 (not shown in FIG. 2B) that match search query 150. A search of custom search index 130 by search engine(s) 160 may return metadata search results 125 that match search query 150. Metadata search results 125 and a link 200 to custom content server 155 may be provided to client 140.

Client 140 may use the provided link 200 to engage in a key exchange 240 with custom content server 155. In one embodiment, key exchange 240 may include custom content server 155 delivering a symmetric encryption/decryption key to client 140. In another embodiment, key exchange 240 may include an exchange of asymmetric keys between client 140 and custom content server 155. The asymmetric keys may be associated with a public/private key asymmetric encryption/decryption scheme (e.g., Diffie-Hellman, DSS, ElGamal, RSA, IKI, PGP, SSL, ssh). For example, client 140 may send its public key to custom content server 155, and custom content server 155 may send its public key to client 140. Subsequent to key exchange 240, custom content server 155 may encrypt the custom content using client 140's public key and custom content server 155's private key and send encrypted custom content 230 to client 140. Upon receipt, client 140 may decrypt encrypted custom content 230 using client 140's private key and custom content server 155's public key.

Exemplary Network Configuration

Figure 3:
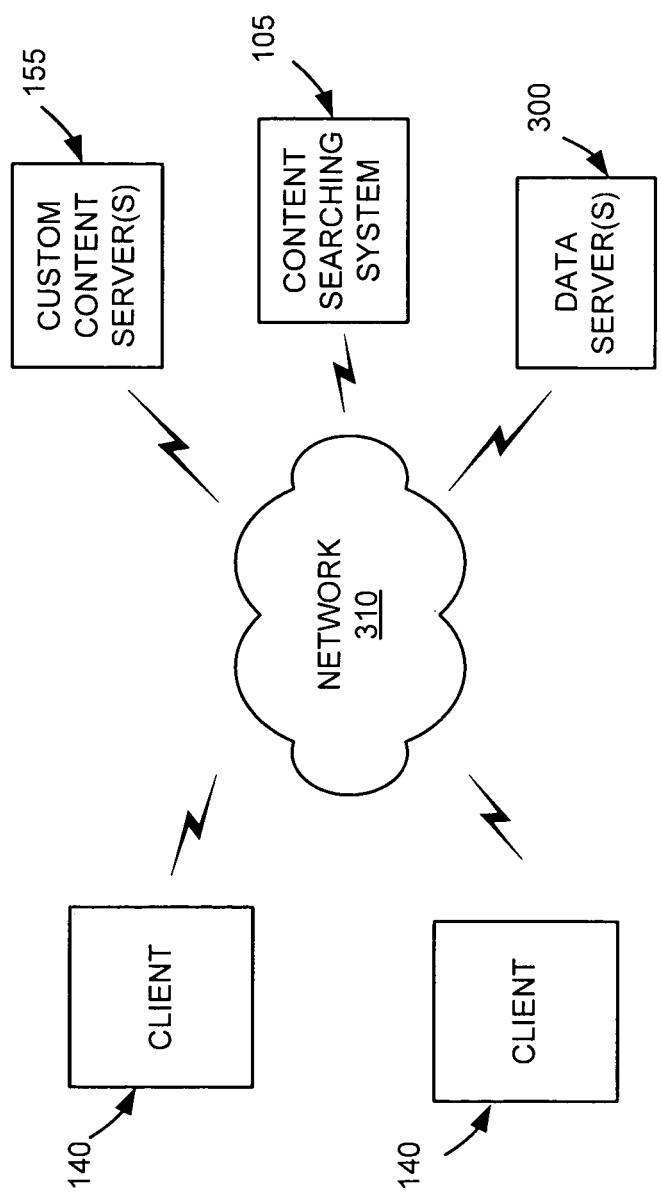
FIG. 3 is an exemplary diagram of a network in which systems and methods described herein may be implemented.

FIG. 3 is an exemplary diagram of a network in which systems and methods described herein may be implemented. The network may include multiple clients 140, a content searching system 105, custom content server(s) 155 and a data server(s) 300 connected via a network 310. Two clients 140, content searching system 105, one or more custom content servers 155, and one or more data servers 300 have been illustrated as connected to network 310 for simplicity. In practice, there may be more or fewer clients, content searching systems, custom content servers and/or data servers. Also, in some instances, a client 140 may perform one or more functions of content searching system 105 or server(s) 155 or 300; or content searching system 105 or a server 155 or 300 may perform one or more functions of a client 140.

Clients 140 may include client entities. A client entity may be defined as a device, such as a personal computer, a mobile telephone, a personal digital assistant (PDA), a lap top, or another type of computation or communication device, a thread or process running on one of these devices, and/or an object executable by one of these devices. Clients 140 may implement a browser for browsing documents stored at data server(s) 300. Clients 140 may also use the browser for accessing content searching system 105 to search documents (e.g., web content) associated with data server(s) 300 and/or custom content, as described further below.

Data server(s) 300 may store or maintain documents that may be browsed by clients 140, or may be crawled by content searching system 105. Such documents may include data related to published news stories, products, images, user groups, geographic areas, or any other type of data. For example, data server(s) 300 may store or maintain news stories from any type of news source, such as, for example, the Washington Post, the New York Times, Time magazine, or Newsweek. As another example, server(s) 300 may store or maintain data related to specific products, such as product data provided by one or more product manufacturers. As yet another example, server(s) 300 may store or maintain data related to other types of web documents, such as pages of web sites (e.g., web content).

Content searching system 105 may include one or more hardware and/or software components that access, fetch, index, search, and/or maintain general web documents and/or custom content documents. Content searching system 105 may implement a data aggregation service by crawling a corpus of documents (e.g., web pages) hosted on data server(s) 300, indexing the documents, and storing information associated with these documents in a repository of crawled documents. The aggregation service may be implemented in other ways, such as by agreement with the operator(s) of data server(s) 400 to distribute their documents via the data aggregation service.

Custom content server(s) 155 may store unencrypted and/or encrypted custom content. Custom content server(s) 155 may further store decryption keys that may be used to decrypt encrypted custom content. In one implementation, custom content server(s) 155 may be separate from (e.g., remote from) content searching system 105 and/or data server(s) 300.

While content searching system 105 and server(s) 155 and 300 are shown as separate entities, it may be possible for content searching system 105 to perform one or more of the functions of servers 155 or 300, and vice versa. For example, it may be possible for content searching system 105 and server(s) 155 or 300 to be implemented as a single entity. It may also be possible for one of content searching system 105 or server(s) 155 or 300 to be implemented as two or more separate (and possibly distributed) devices.

Network 310 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet or a combination of networks. The PLMN(s) may further include a packet-switched sub-network, such as, for example, General Packet Radio Service (GPRS), Cellular Digital Packet Data (CDPD), or Mobile IP sub-network. Clients 140, content searching system 105 and server(s) 155 or 300 may connect to network 410 via wired and/or wireless connections.

Exemplary Content Searching System

Figure 4:
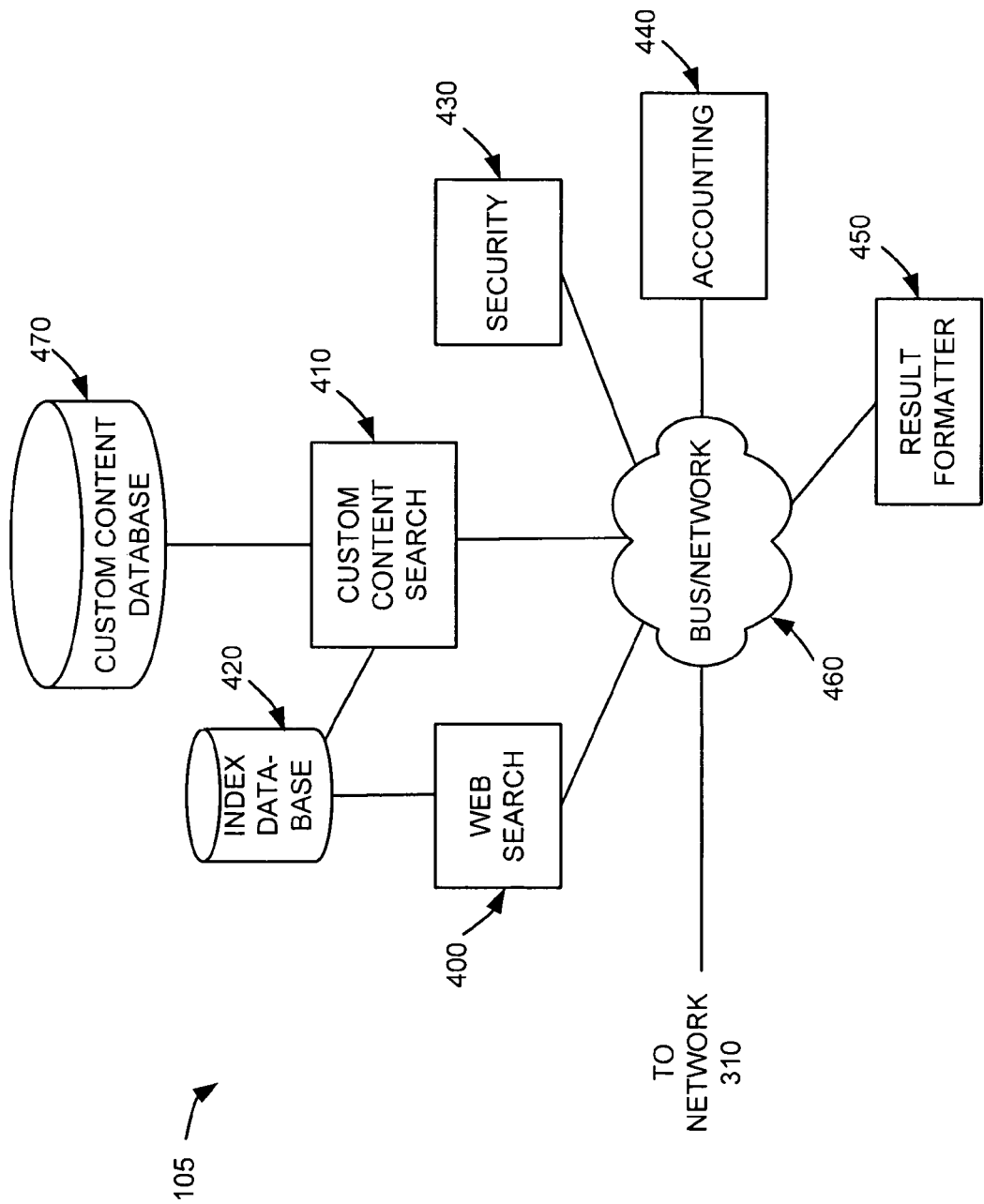
FIG. 4 is an exemplary diagram of the content searching system of FIG. 3.

FIG. 4 is an exemplary diagram of content searching system 105. As shown in FIG. 4, content searching system 105 may include a web search unit 400, a custom content search unit 410, an index database 420, a security unit 430, an accounting unit 440, a result formatter 450 and a custom content database 470 interconnected via a bus and/or network 460 with network 310. Web search unit 400, custom content search unit 410, security unit 430, accounting unit 440 and result formatter 450 may be implemented as software and/or hardware components within a single server entity, or as software and/or hardware components distributed across multiple server entities.

Web search unit 400 may crawl documents (e.g., containing web content) stored at data server(s) 300, index the crawled documents to create a web search index and search the crawled documents using the web search index. Custom content search unit 410 may obtain custom content, such as, for example, content uploaded from users, content designated by a user as being part of its custom content (e.g., the user designates one or more web sites or web pages to be included in the user's custom content), content obtained from sources that require subscriptions for access to the content, and/or content on a given topic that may be obtained and aggregated from multiple sources, index the content in separate custom search indexes to create multiple different custom search indexes 130 and search the custom content using one or more of the different custom search indexes 130.

Index database 420 may store a web search index 110 and one or more custom search indexes 130. Index database 420 may store web search index 110 and the one or more custom search indexes 130 as different data structures that may be searched independently of one another. Alternatively, index database 420 may store one or more custom search indexes 130 within the same data structure as web search index 110 in a manner that they may be searched independently of one another.

Security unit 430 may authenticate users desiring to upload custom content to custom content search unit 410 and/or may authenticate users desiring to search one or more custom content indexes 130 associated with custom content. Security unit 430 may authenticate users by passing authentication tokens to the users which define the custom search indexes that are accessible by a particular user, and may contain security keys to permit encryption for sensitive information. Security unit 430 may authenticate users and authorize custom content search unit 410 to permit access to selected custom search indexes to the authenticated users.

Accounting unit 440 may establish and modify user access rights, may record and report user access to selected custom search indexes, may obtain feedback from users accessing given custom search indexes and/or may track and control access to given custom search indexes based on whether users have subscribed to the custom search indexes.

Result formatter 450 may return search results obtained from web search unit 400 and/or custom content search unit 410 in a formatted and organized manner. Result formatter 450 may combine custom content search results together with web content search results in a way that is meaningful to the user (e.g., in a hypertext markup language (HTML) page). Bus and/or network 460 may include a communication path, such as, for example, a system bus or a network that permits web search unit 400, custom content search unit 410, security unit 430, accounting unit 440 and result formatter 450 to communicate with one another and with entities on network 310. Custom content database 470 may store custom content, custom content metadata and/or encrypted custom content for use by custom content search unit 410.

Although FIG. 4 shows exemplary components of content searching system 105, in other implementations, content searching system 105 may include fewer, different, or additional components than depicted in FIG. 4. In still other implementations, one or more components of content searching system 105 may perform the tasks performed by one or more other components of content searching system 105.

Exemplary Web Search Unit

Figure 5:
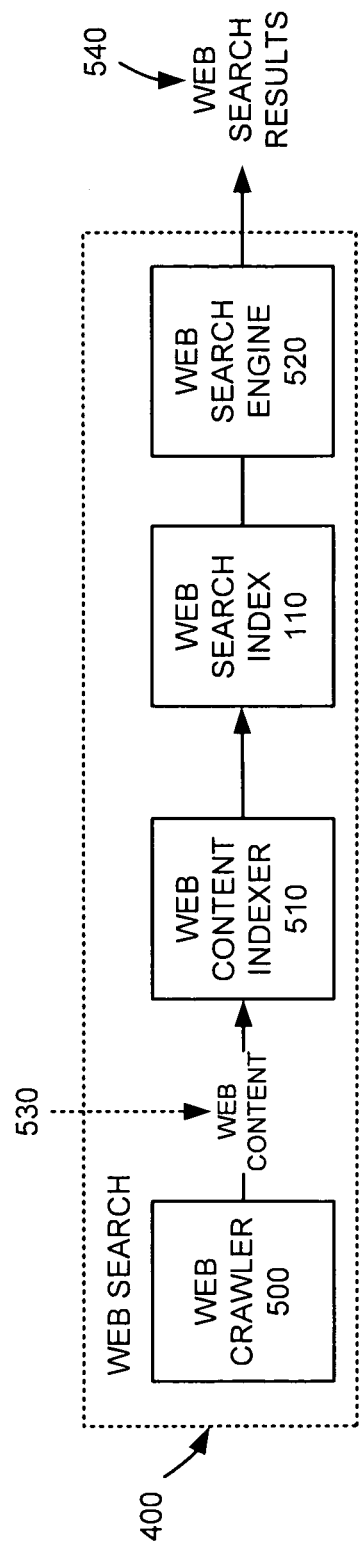
FIG. 5 is an exemplary diagram of the web search unit of FIG. 4.

FIG. 5 is an exemplary diagram of web search unit 500. As shown in FIG. 5, web search unit 400 may include a web crawler 500, a web content indexer 510, a web search index 110 and a web search engine 520.

Web crawler 500 may find and retrieve web content 530 (e.g., web documents) and provide the retrieved web content 530 to web content indexer 510. For example, web crawler 500 may send a request to a web server for a web document, download the web document, and then provide the web document to web content indexer 510. Web content indexer 510 may index web content 530 to create web search index 110. For example, web content indexer 510 may take the text or other data of a given crawled document, extract individual terms or other data from the text of the document and sort those terms or other data (e.g., alphabetically) into web search index 110. Other techniques for extracting and indexing content, that are more complex than simple word-level indexing, may also be used, including techniques for indexing XML data, image data, video data, audio data, etc. Each entry in web search index 110 may contain a term or other data stored in association with a list of documents in which the term or other data appears and the location within the document where the term or other data appears.

Web search engine 520 may search web search index 110, based on a received search query, to match terms of the search query with terms or other data (e.g., video data, image data, audio data, etc.) contained in entries in web search index 110. Web search engine 520 may retrieve a corresponding list of documents from each entry in web search index 110 that matches a term of the search query. The lists of documents retrieved from one or more entries in web search index 110 may be returned as web search results 540. In one implementation, each result of web search results 640 may include a uniform resource locator (URL) associated with a corresponding search result document and, possibly, a snippet of content extracted from the corresponding search result document.

Exemplary Custom Search Unit

Figure 6:
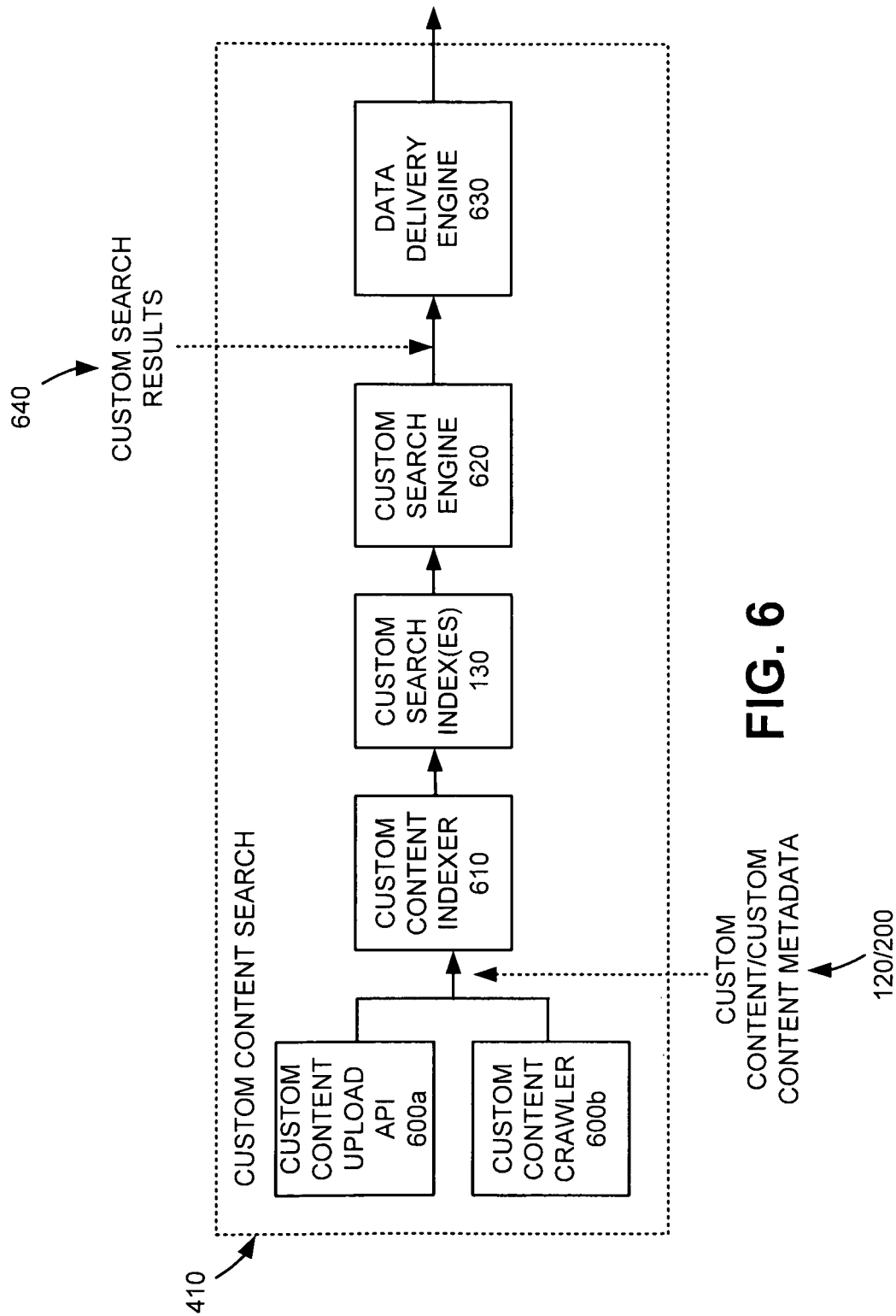
FIG. 6 is an exemplary diagram of the custom content search unit of FIG. 4.

FIG. 6 is an exemplary diagram of custom content search unit 410. As shown in FIG. 6, custom content search unit 410 may include a custom content upload Application Programmer Interface (API) 600a, a custom content crawler 600b, a custom content indexer 610, one or more custom search indexes 130, a custom search engine 620 and a data delivery engine/content formatter 630.

Custom content upload API 600a may receive custom content 120 or custom content metadata 115 uploaded from one or more users (e.g., one or more authenticated users). For example, a user at custom content server 155 may upload custom content 120 or custom content metadata 115 to custom content search unit 410 via custom content upload API 600a. The uploaded content may include data of any type or format. In one implementation, the uploaded content may include metadata (e.g., Extensible Markup Language (XML) data). The metadata may describe corresponding content and may include pointers to actual content. In another implementation, custom content upload API 600a may include a translation engine for translating any type or format of uploaded data into a particular type or format of data that can be more easily processed by custom content indexer 610. Custom content upload API 600a may pass the received custom content 120 to custom content indexer 610.

Custom content crawler 600b may crawl specific content on the web or within one or more databases to retrieve documents that may be indexed in a corresponding custom search index 130. Custom content crawler 600b may crawl any type of document or database, including, for example, flatfiles, binary files, etc. For example, custom content crawler 600b may crawl available documents on the web containing content directed to a specific topic (e.g., dogs, football, etc.) or documents identified by a custom content provider (e.g., the "owner" of a corpus of custom content). As an additional example, custom content crawler 600b may crawl documents similar to documents identified by the custom content provider as being part of the provider's custom content. The custom content provider may, thus, designate content that may be grouped together and searched via the provider's custom search index. Custom content crawler 600b may, in some implementations, need to be authenticated by content providers associated with specific custom content crawled on the web or within one or more databases. Custom content crawler 600b may pass the crawled custom content 120 to custom content indexer 610.

Custom content indexer 610 may index custom content 120 or custom content metadata 115 to create custom search index(es) 130. For example, custom content indexer 610 may take the text or other data of custom content 120 or custom content metadata 115, extract individual terms from the text or other data of custom content 120 or custom content metadata 115, and sort those terms or other data (e.g., alphabetically) into a single custom search index 130. Other techniques for extracting and indexing content, that are more complex than simple word-level indexing, may also be used, including techniques for indexing XML data, images, videos, etc. Each entry in a custom search index 130 may contain a term or other data stored in association with an item of content in which the term or other data appears and a location within the custom content where the term or other data appears.

Custom search engine 620 may search custom search index(es) 130, based on a received search query, to match terms of the search query with terms or other data contained in entries in custom search index(es) 130. If custom search index(es) 130 includes multiple different custom search indexes, then custom search engine 620 may search, based on the received search query and, possibly, user authentication, selected ones of the different custom search indexes. Custom search engine 620 may retrieve a corresponding list of items of custom content from each entry in custom search index 130 that matches a term of the search query. The lists of items of content retrieved from one or more entries in custom search index 130 may be returned as custom search results 640. In one implementation, each result of custom search results 640 may include a URL associated with a corresponding search result document and, possibly, a snippet of content extracted from the corresponding search result document. Data delivery engine/content formatter 630 may receive the search results from custom search engine 620, format the search results into a meaningful data format (e.g., into a HTML document) that can be received and displayed by the user (e.g., via a web browser). Data delivery engine 630 may customize the formatting of the search results (e.g., the content and visual format of the data) received from custom search engine 620 based on individual user preferences or based on the preferences of the custom content provider whose custom content is being searched.

Exemplary Security Unit

Figure 7:
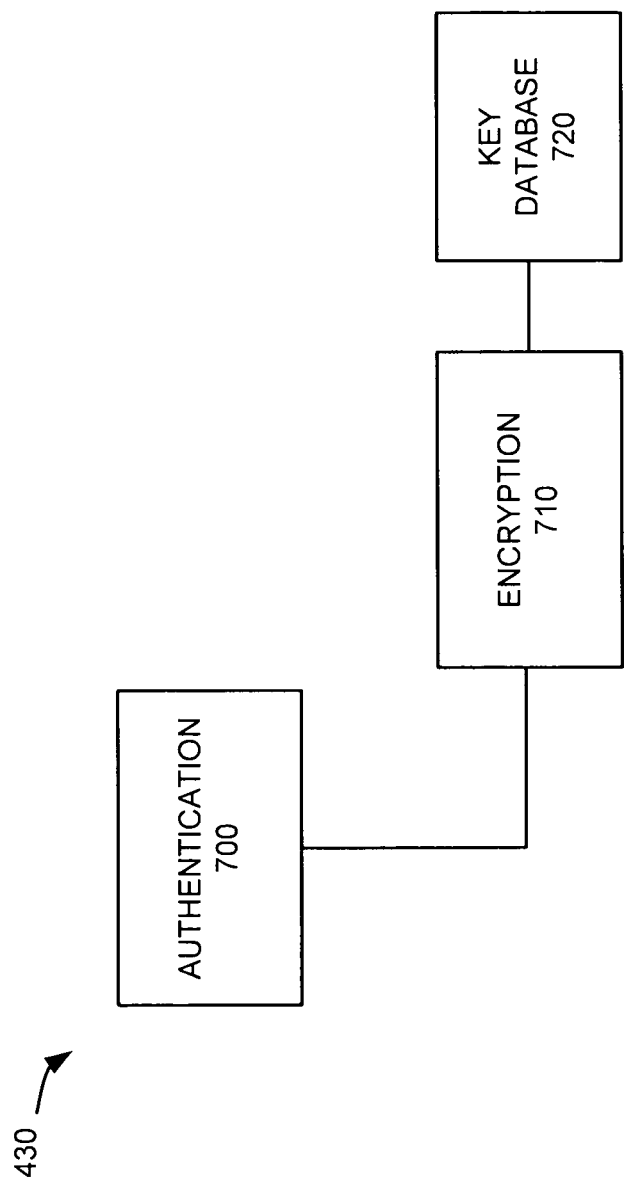
FIG. 7 is an exemplary diagram of the security unit of FIG. 4.

FIG. 7 illustrates a security unit 430 according to an exemplary implementation. Security unit 430 may include an authentication unit 700, an encryption unit 710 and a key database 720. Authentication unit 700 and encryption unit 710 may be implemented as software or hardware components within a single server entity, or as software or hardware components distributed across multiple server entities.

Authentication unit 700 may include functionality for authenticating users that upload custom content to custom content searching system 105, and/or functionality for authenticating users that wish to access and search custom content indexed by custom content searching system 105. Authentication unit 700 may, for example, authenticate a user and pass one or more authentication tokens (e.g., one authentication token for accessing custom content associated with one or more custom search indexes) for each custom search index or group of custom search indexes to a particular user, where the one or more authentication tokens may include security keys intended to allow for channel encryption (e.g., for sensitive or confidential custom content that needs secure transmission). Encryption unit 710 may include functionality for distributing encryption keys obtained from key database 720 to clients 140, and for encrypting and decrypting data sent to, or received from, clients 140. Key database 720 may store encryption key material that may be retrieved for distribution to clients 140 for encrypting and decrypting data sent to, or received from, clients 140.

Exemplary Index Database

Figure 8:
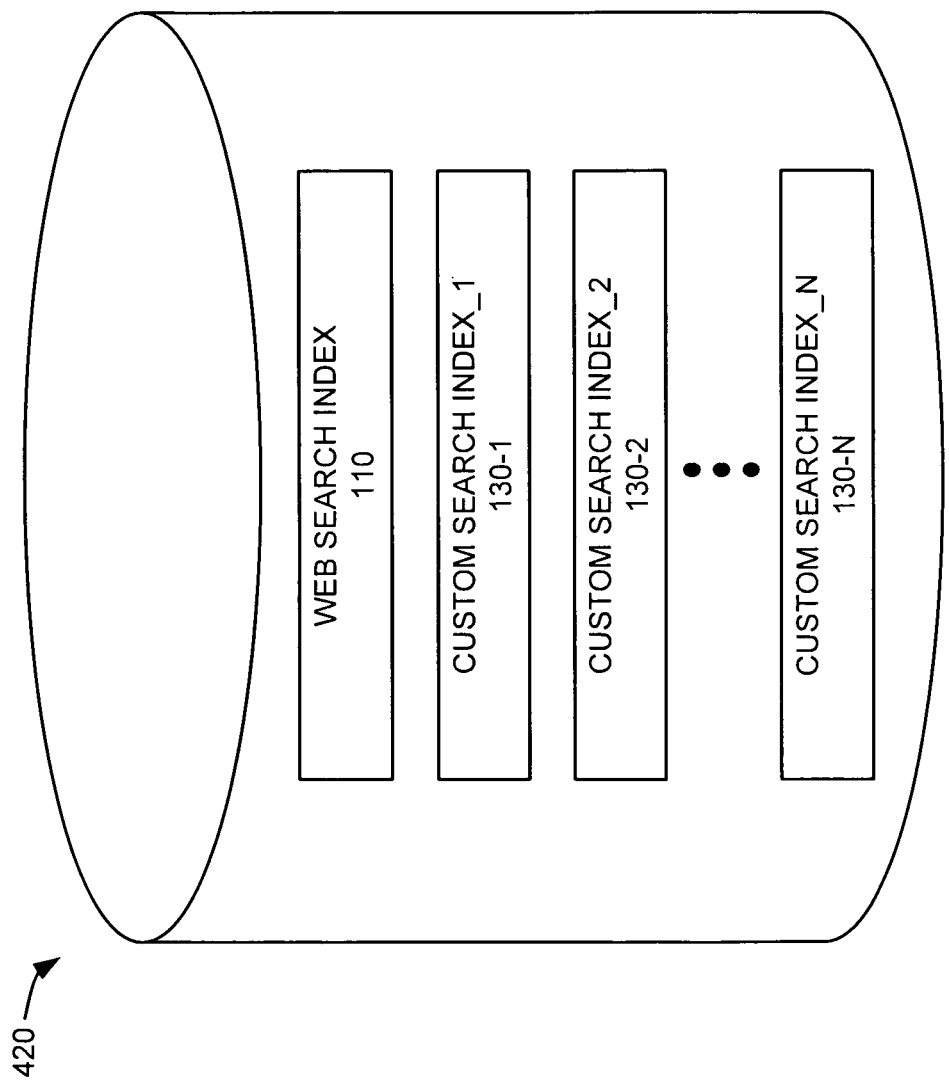
FIG. 8 is an exemplary diagram of the index database of FIG. 4.

FIG. 8 is an exemplary diagram of index database 420. As shown in FIG. 8, index database 420 may include a web search index 110 and one or more custom search indexes 130-1 through 130-N (where N≧1). Each of custom search indexes 130-1 through 130-N may include data structures that are separate and distinct from one another, and from web search index 110. Web search index 110 may include multiple entries, with each entry containing a term or other data stored in association with a list of documents in which the term or other data appears and the location within the document text where the term or other data appears. Web search engine 520 may search web search index 110 based on a received search query to match terms of the search query with terms or other data contained in entries of web search index 110.

Each one of custom search indexes 130-1 through 130-N may include multiple index entries, with each entry containing a term or other data stored in association with an item of custom content in which the term or other data appears and a location within the custom content where the term or other data appears. Custom search engine 620 may search custom search index(es) 130, based on a received search query, to match terms of the search query with terms or other data contained in entries in custom search index(es) 130.

Exemplary Content Indexing Process

Figure 9:
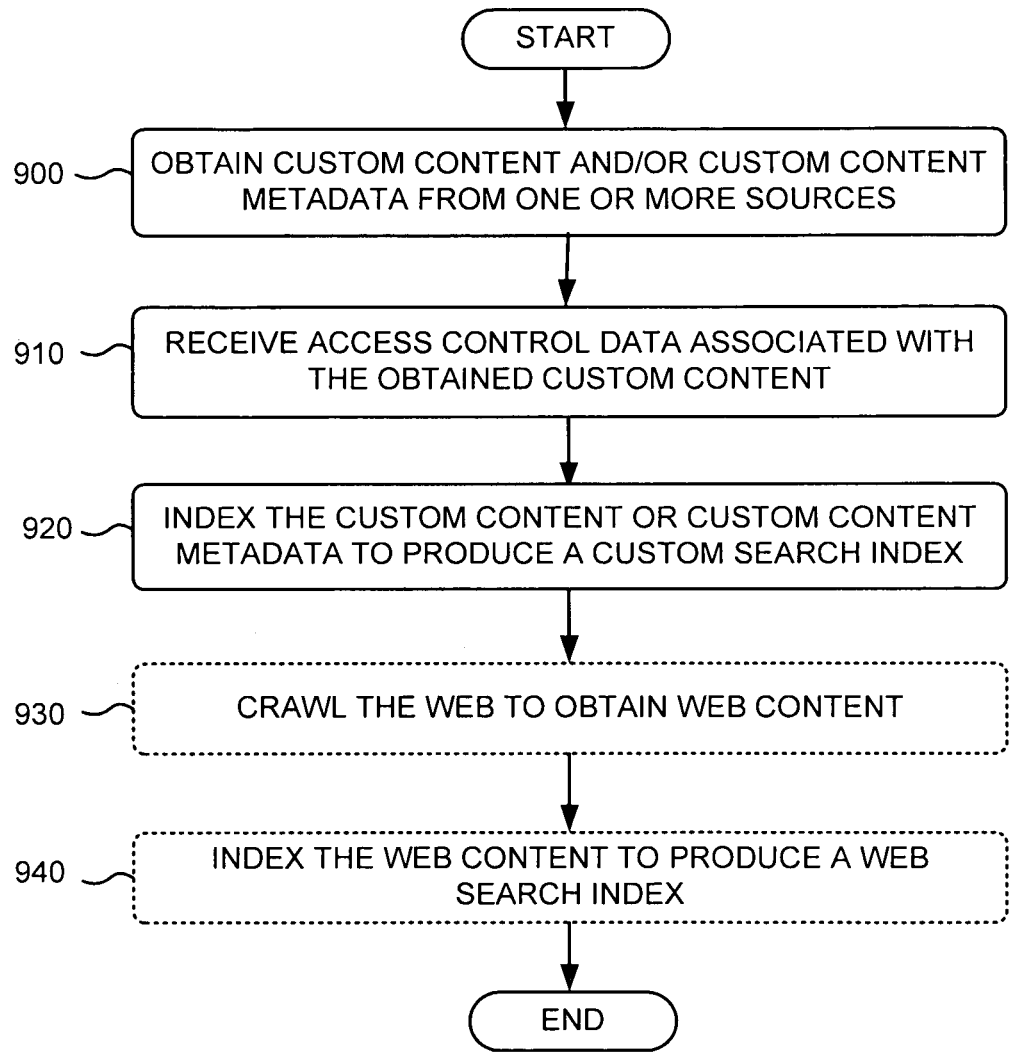
FIG. 9 is a flowchart of an exemplary process for indexing custom content and, possibly, web content.

FIG. 9 is a flowchart of an exemplary process for indexing custom content and, possibly, web content. The process exemplified by FIG. 9 may be performed by content searching system 105.

The exemplary process may begin with obtaining custom content 120 and/or custom content metadata 115 from one or more sources (block 900). For example, custom content upload API 600a may upload custom content or custom content metadata from one or more users at custom content server(s) 155. As another example, custom content upload API 600a may upload subscription content from one or more subscription content service providers. As an additional example, subscription content from one or more subscription content service providers, or content from documents obtained from multiple sources that is related to a same topic, may be obtained from custom content crawler 600b of custom content search unit 410 for indexing in respective custom indexes. As an additional example, custom content crawler 600b may crawl documents (e.g., web documents) designated by the user (e.g., the "owner" of a corpus of custom content) as being part of the user's custom content. The user may, thus, designate content (e.g., web documents) that may be grouped together and searched via the user's custom search index. In one implementation, the obtained custom content metadata may also include identifiers that identify the encryption scheme used to encrypt corresponding custom content stored at custom content server 155.

Custom content crawler 600b may also crawl and retrieve content from web documents, that may be ranked relatively low by web search engine 520, for inclusion in a respective custom search index. Custom content crawler 600b, therefore, may crawl content already crawled by web crawler 500 that may be ranked higher with respect to a given corpus of custom content as compared to ranking of the content by web search engine 520. For example, documents about a certain topic may be ranked highly with respect to content associated with a custom search index that is related to that topic. An "owner" of a corpus of custom content may, thus, group together content that the "owner" desires to be included in the corpus of custom content (e.g., uploaded custom content grouped together with other user designated content, such as, for example, user designated web documents).

Many different types of custom content may be uploaded and indexed consistent with exemplary embodiments. For example, a given custom search index may aggregate and index multiple subscription-based web sites. If a user subscribes to a group of subscription-based web sites, then the user can search content from all of the subscription-based web sites simultaneously using a single custom search index. As another example, a company may upload all of their company events, policies, etc. to a custom search index such that only company employees may search the custom search index. As an additional example, a company, such as, for example, Netflix, may upload custom content to their own custom search index. Netflix can increase traffic to their own web site by building a custom search index of their movie titles. Users may then join a Netflix custom index group and automatically receive movie title search results when they perform a regular web search (e.g., a Google search on google.com). Moreover, Netflix could tag new movie releases so that Netflix users can just type the search query "new releases" in, for example, the Google search interface and receive newly released movie titles as part of the returned search results. As yet another example, a software company, such as, for example, Oracle, could upload their knowledge base to their own custom search index and then make this knowledge base available only to licensed users. The knowledge base could include frequently asked questions (FAQs), documentation, troubleshooting tips, customer support information, bugs, etc. As a further example, local libraries, Amazon.com or Barnes & Nobles could create their own custom indexes. Then, when a user who enjoys reading books searches a topic (e.g., using Google search) and when there are books that match that search, the books may be returned as results in the search results so that the user may check for pricing and/or availability. As yet another example, a user could create a custom search index relating to a particular topic by identifying documents (e.g., web documents) relating to that topic. As another example, a user can create a custom search index containing his bookmarks (e.g., favorite web pages or sites) that can be shared with, and/or searched, by other users.

Access control data associated with the obtained custom content or custom content metadata may be received (optional block 910). Each custom search index 130-1 through 130-N may, or may not, have access control data associated with it. Thus, some of custom search indexes 130-1 through 130-N may be restricted to authenticated users (e.g., subscribing users) while others may not (e.g., available to non-subscribing users). The received access control data may also be associated with other custom content. Therefore, a given user may subscribe to, or have an account that is associated with, N different custom search indexes, thus, permitting the given user to search those indexes automatically for each of the user's searches. The access control data may include data used for authenticating users who may supply additional custom content to a given custom search index or for authenticating users who may access and search custom content associated with a given custom search index. For example, the access control data may include a log-in identifier and a password for a respective user. Authentication unit 800 may store the received access control data for use in subsequent user authentication.

The custom content or custom content metadata may be indexed to produce a custom search index (block 920). For example, custom content indexer 710 may take the text of custom content 120 or custom content metadata 115 received from a user (e.g., the custom content provider), extract individual terms or other data from custom content 120 or custom content metadata 115, and sort those terms (e.g., alphabetically) into a custom search index 130. Each entry in a custom search index 130 may contain a term or other data stored in association with an item of content in which the term or other data appears and a location within the custom content where the term or other data appears. Custom search index 130 may be stored in index database 420.

The web may be crawled to obtain web content (optional block 930). For example, web crawler 500 may find and retrieve web content 530 (e.g., from web documents) and hand the retrieved web content 530 off to web content indexer 510. Web crawler 500 may send a request to a web server for a web page, download the entire web page, and then hand the web page off to web content indexer 510.

The obtained web content may then be indexed to produce a web search index 110 (optional block 940). Web content indexer 510 may index received web content 630 to create web search index 110. For example, web content indexer 610 may take the text or other data of a given crawled document, extract individual terms or other data from the document and sort those terms or other (e.g., alphabetically) into web search index 110. Each entry in web search index 110 may contain a term or other data stored in association with a list of documents in which the term or other data appears and the location within the document's text where the term or other data appears. Web search index 110 may be stored in index database 420.

Exemplary Content Searching Process

Figure 10A:
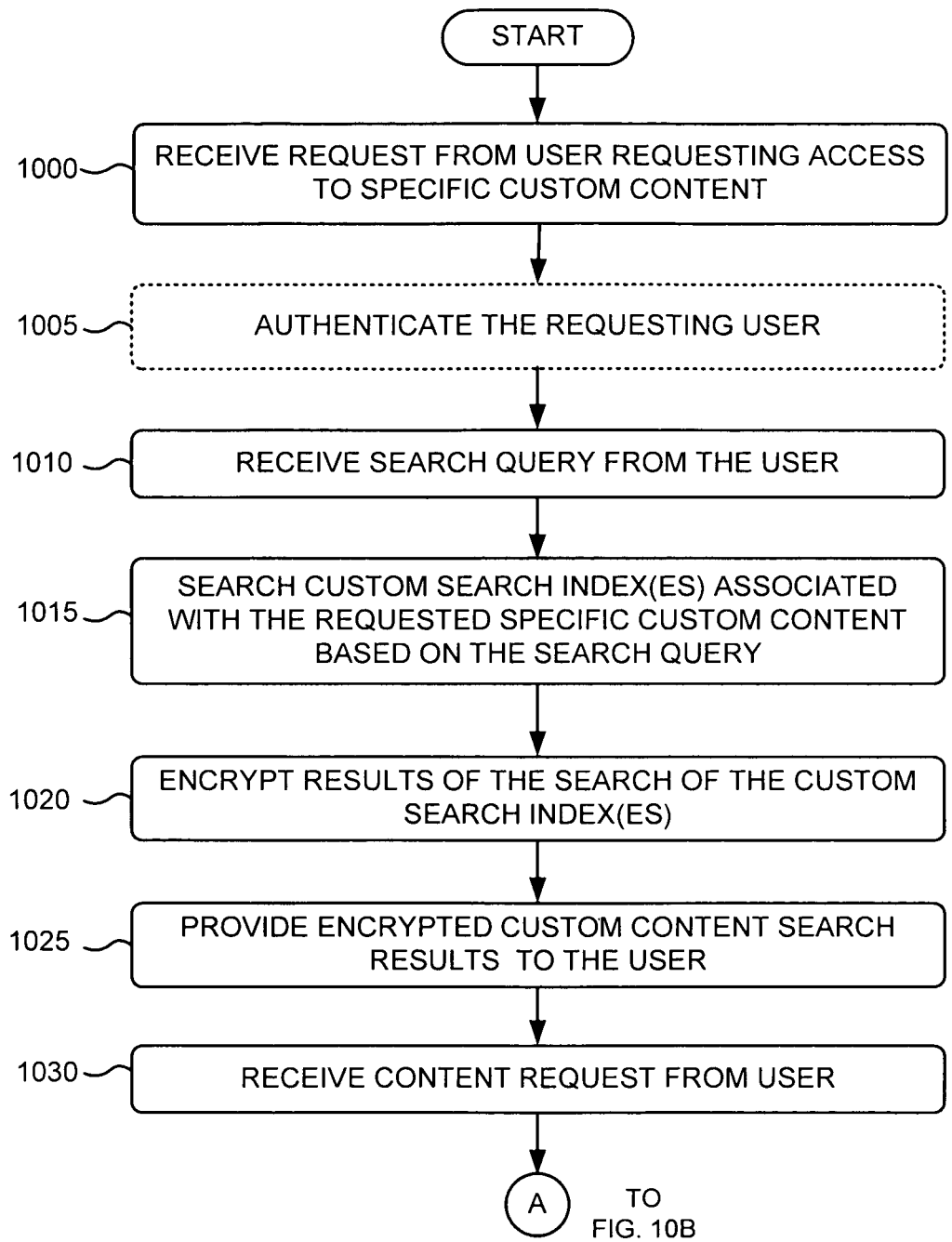
FIGS. 10A and 10B are flowcharts of a process for searching one or more custom search indexes according to a first exemplary implementation.
Figure 10B:
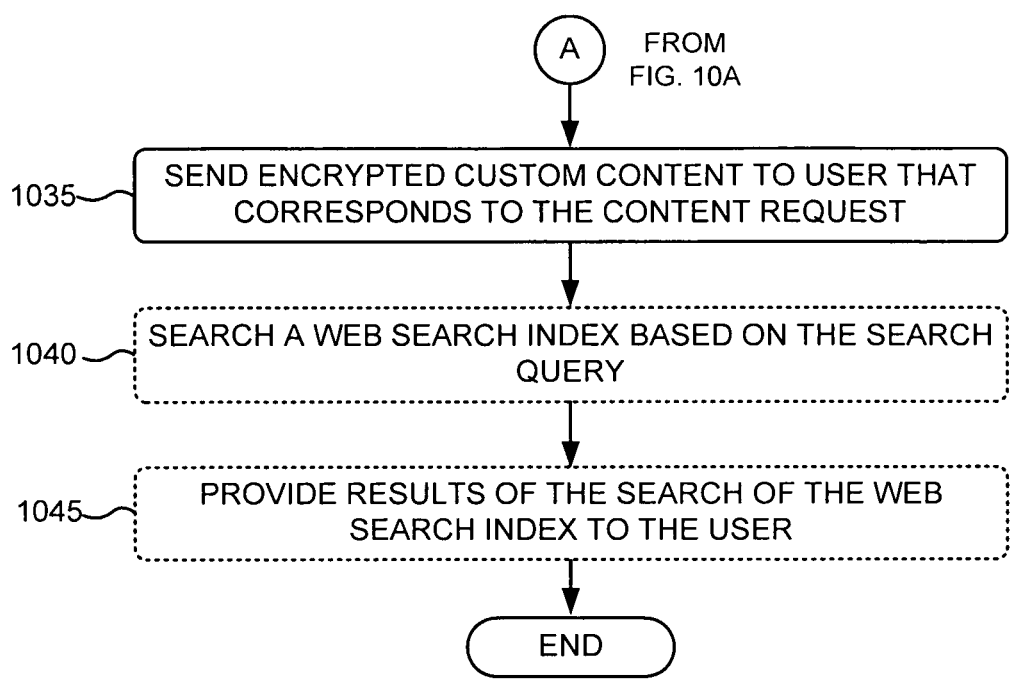

FIGS. 10A and 10B are flowcharts of a process for searching one or more custom search indexes produced, for example, using the exemplary process of FIG. 9, according to a first exemplary implementation. In the exemplary implementation of FIGS. 10A and 10B, one or more custom search indexes are searched, the search results are encrypted, and the encrypted search results are provided to the searching user. The process exemplified by FIGS. 10A and 10B may be performed by content searching system 105, possibly in conjunction with client 140 and custom content server 155.

Figure 11:
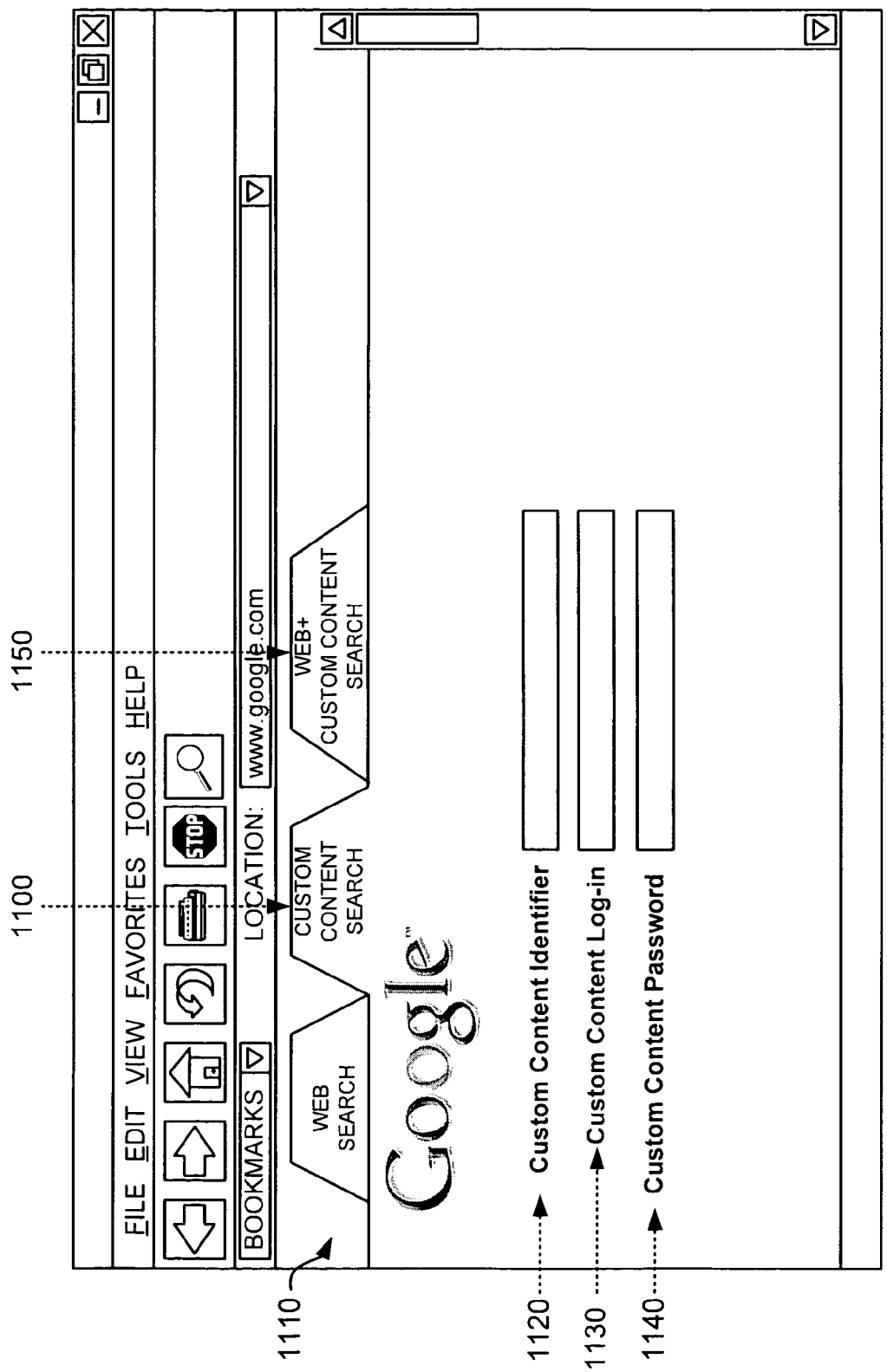
FIG. 11 is an exemplary diagram of a document that a user may use to authenticate himself/herself before searching custom content.
Figure 12:
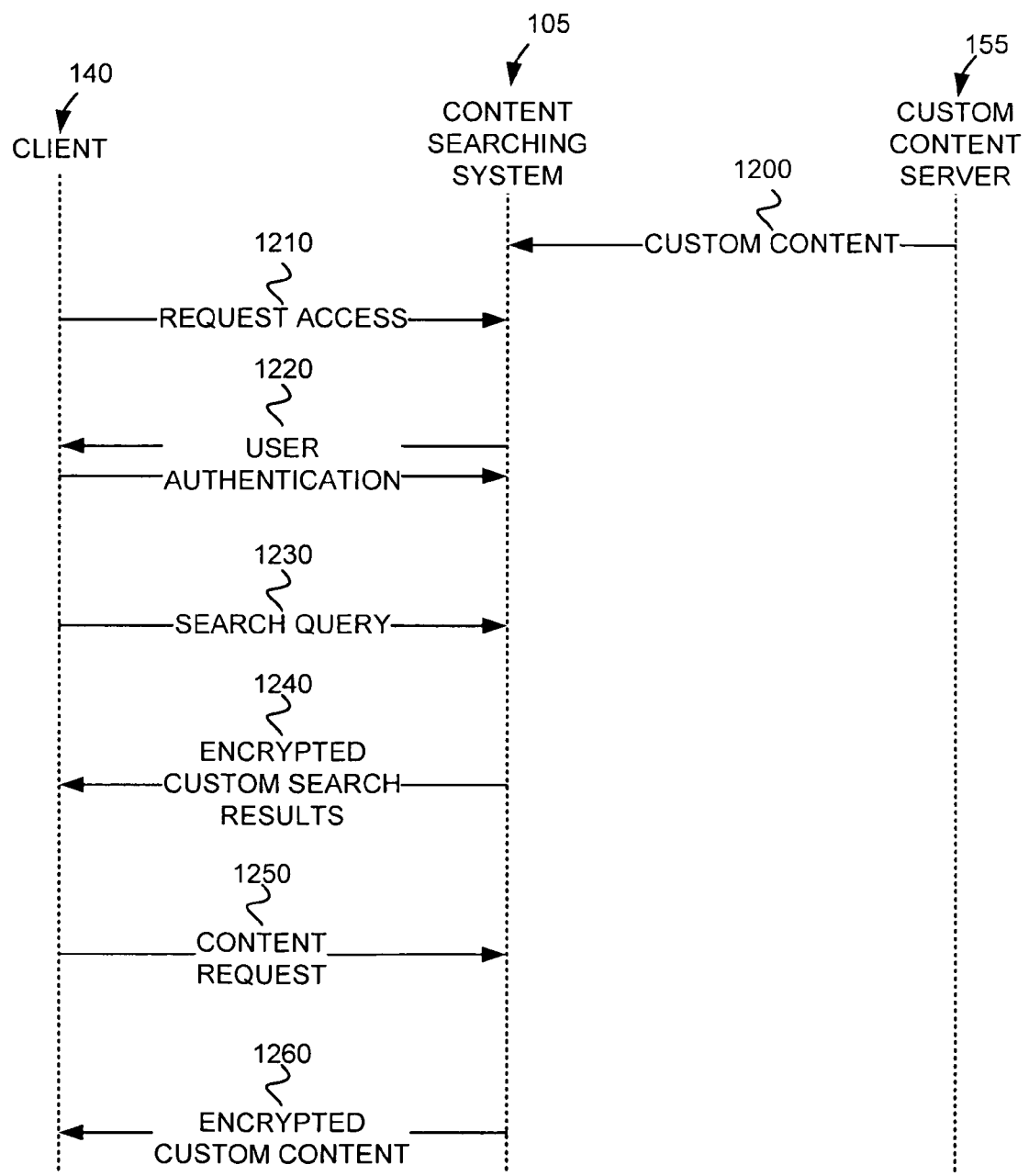
FIG. 12 is a diagram illustrating exemplary communications between a client, content searching system and a custom content server associated with the exemplary process of FIG. 11.

The exemplary process may begin with the receipt of a request from a user requesting access to specific custom content (block 1000). For example, the access request may include a log-in identifier and password supplied by the user. As shown in FIG. 11, a user at a client 140 may select a "custom content search" tab 1100 contained in a search document 1110 displayed by the user's browser. Fields, such as, for example, a custom content identifier field 1120, a custom content log-in field 1130 and a custom content password field 1140 may then be displayed in search document 1110. The user may enter appropriate data into fields 1120, 1130 and 1140 to authenticate himself/herself as having a right to access the desired custom content. As further shown in FIG. 11, the user at client 140 may select a "web+custom content search" tab 1150. The user may enter appropriate data into fields 1120, 1130 and 1140 to search a specific custom search index and the web search index. Any custom content identifier data entered into custom content identifier field 1120 may be associated with one or more custom search indexes. For example, a single given custom content identifier may be associated with, and allow access to, several different custom search indexes. In another implementation, a given custom content log-in and custom content password may be implicitly associated with one or more custom search indexes. In this implementation, the user does not have to explicitly identify the custom content that he desires to access, since the user's log-in and password have already been associated with one or more custom search indexes. In other implementations, the user may enter multiple different custom content identifiers to select multiple custom search indexes to search. In some implementations in which the custom content does not require authentication (e.g., is available to non-subscribers), mere selection of specific custom content, without user authentication, may only be required for access to the specific custom content. FIG. 12 graphically illustrates a request for access 1210 being sent from client 140 to content searching system 105 to request access to custom content 1200 previously provided by, for example, custom content server 155 to content searching system 105.

The requesting user may then be authenticated (optional block 1005). Authentication unit 700 may authenticate the user using previously received access control data. For example, authentication unit 700 may authenticate the user using the log-in identifier and password supplied by the user. If authentication unit 700 authenticates the user, then the exemplary process may continue with block 1010. If authentication unit 700 does not authenticate the user, then the user may be denied access to the requested custom content. Authentication of the user may occur at the time at which the user requests access to specific custom content, or the authentication may have occurred earlier. For example, a user may log-in at the time the user first accesses search document prior to the user requesting access to specific custom content. For some of the specific custom content associated with a respective custom search index(es), user authentication may not be required and, thus, block 1005 may be skipped. FIG. 12 graphically illustrates a user authentication process 1220 occurring between client 140 and content searching system 105.

Figure 13:
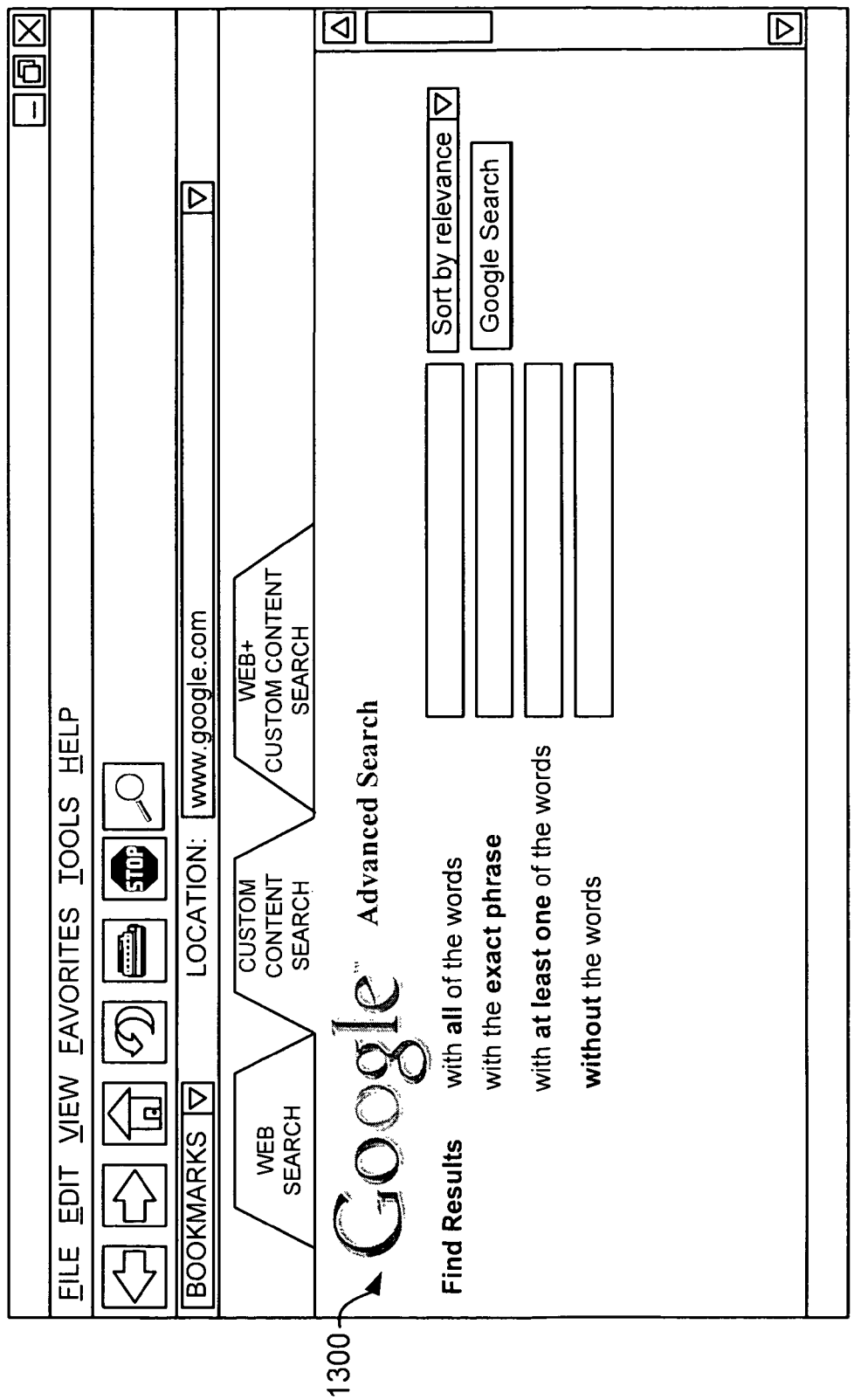
FIG. 13 is an exemplary diagram of a search document that a user may use to enter search terms of a search query.

A search query may be received from the user (block 1010). Custom search engine 620 may receive a search query from a user at a client 140 via network 310. For example, as shown in FIG. 13, a user may enter search terms of a search query into a search document 1300 displayed by the user's browser. One or more custom search indexes associated with the specific custom content that the user requested access to (e.g., corresponding to the custom content identifier(s) supplied by the user) may be searched based on the received search query (block 1130). Custom search engine 620 may search one or more custom search indexes 130-1 through 130-N associated with the specific custom content to which the user requested access to obtain custom search results 640. FIG. 12 graphically illustrates the communication of a search query 1330 from client 140 to content searching system 105.

Results of the search of the custom search index(es) may be encrypted (block 1020). Encryption unit 710 may use any existing encryption technique, such as symmetric or asymmetric encryption, to encrypt the search results. The encryption technique may include, for example, use of a public key/private key encryption process. The encrypted custom content search results may be provided to the user (block 1025). Data delivery engine 630 may format the encrypted search results and provide the encrypted search results to a client 140 associated with the authenticated user via network 310. FIG. 12 graphically illustrates the communication of encrypted custom search results 1240 from content searching system 105 to client 140. A content request may be received (block 1030). For example, as graphically illustrated in FIG. 12, content searching system 105 may receive a content request from client 140. Encrypted custom content, that corresponds to the content request, may be sent to the requesting user (block 1035). For example, as graphically illustrated in FIG. 12, content searching system 105 may send encrypted custom content 1260 to client 140.

Figure 14:
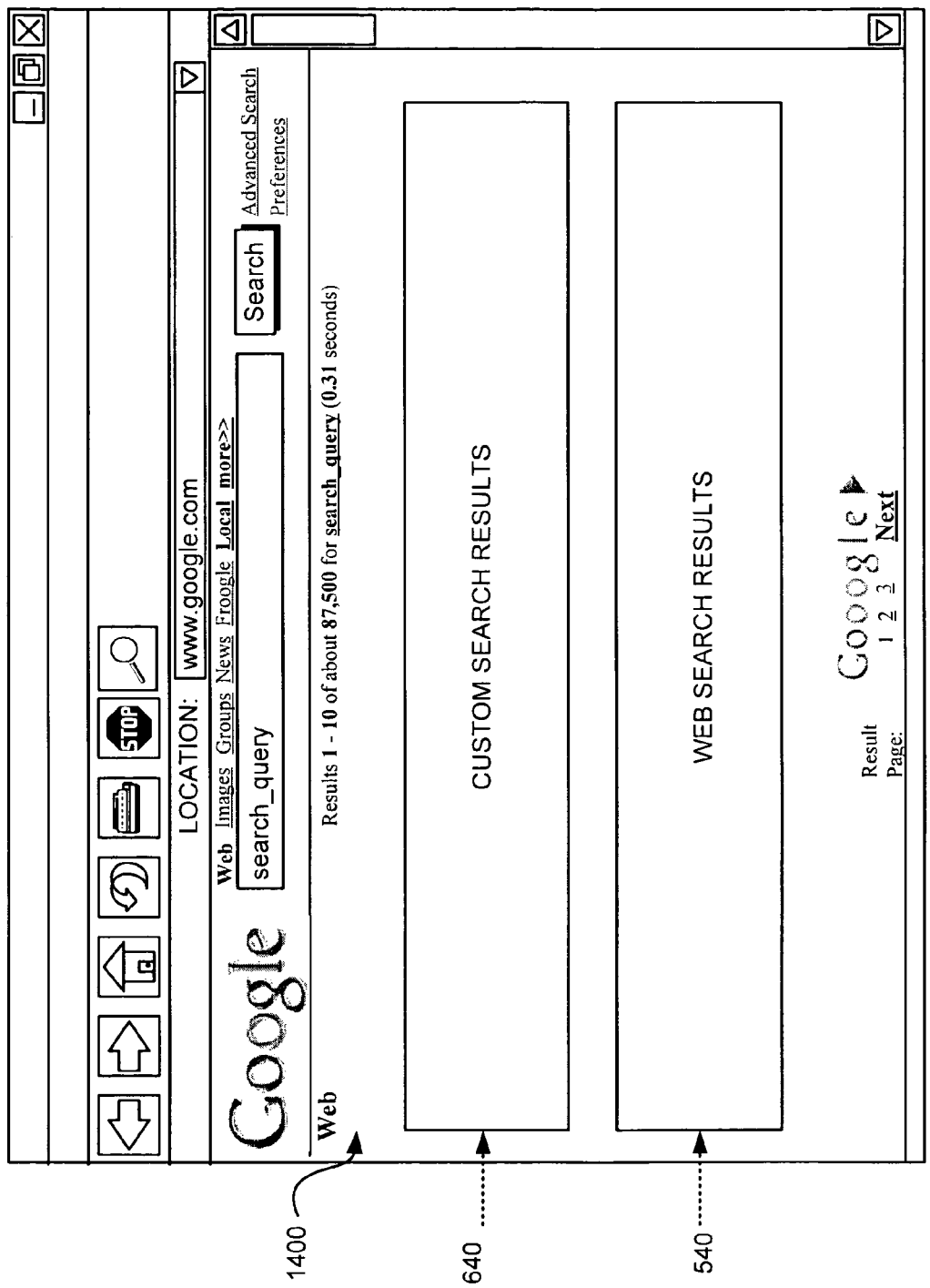
FIG. 14 is an exemplary diagram of a search result document that may provide custom search results and web search results to a user.

Web search index 110 may also be searched based on the search query (optional block 1040). Web search engine 520 may search web search index 110, based on the search query, to return web search results 540. The results of the search of web search index 110 may be provided to the user (optional block 1045). Result formatter 450 may combine the formatted custom search results 640 received from data delivery engine 630 together with web search results 540 and provide the combined results to a client 140 associated with the authenticated user via network 310. For example, as shown in FIG. 14, custom search results 640 may be provided to the authenticated user via a search result document 1400 along with web search results 540. As depicted in FIG. 14, custom search results 640, once decrypted, may be displayed prominently (e.g., at the top of the search results), or highlighted, with respect to web search results 540.

Exemplary Content Searching Process

Figure 15:
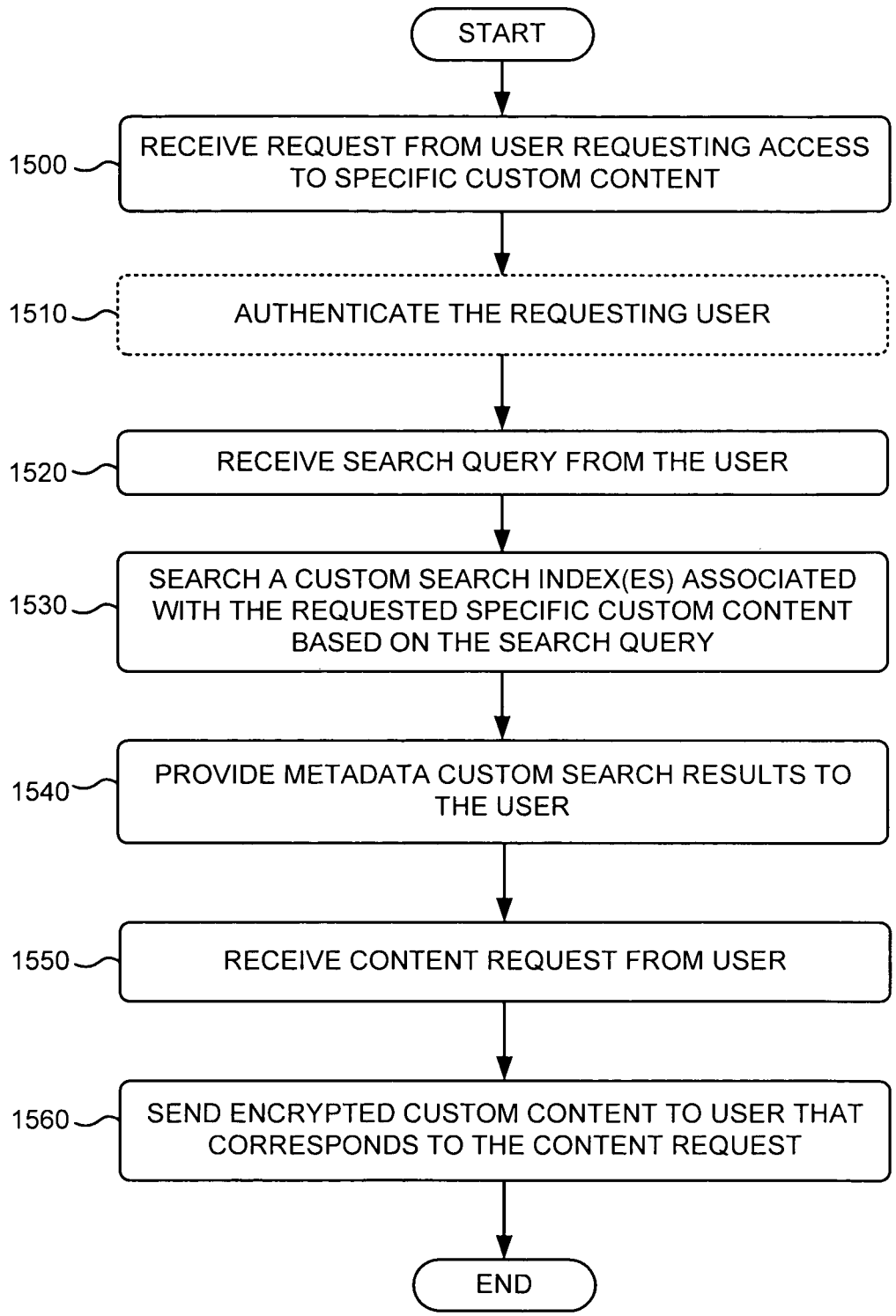
FIG. 15 is a flowchart of a process for searching one or more custom search indexes according to a second exemplary implementation.

FIG. 15 is a flowchart of a process for searching one or more custom search indexes produced, for example, using the exemplary process of FIG. 9, according to a second exemplary implementation. In the exemplary implementation of FIG. 15, content searching system 105 searches custom content metadata 115 and provides metadata search results and possibly corresponding encrypted custom content to the user. The process exemplified by FIG. 15 may be performed by content searching system 210, possibly in conjunction with client 140 and custom content server 155.

Figure 16:
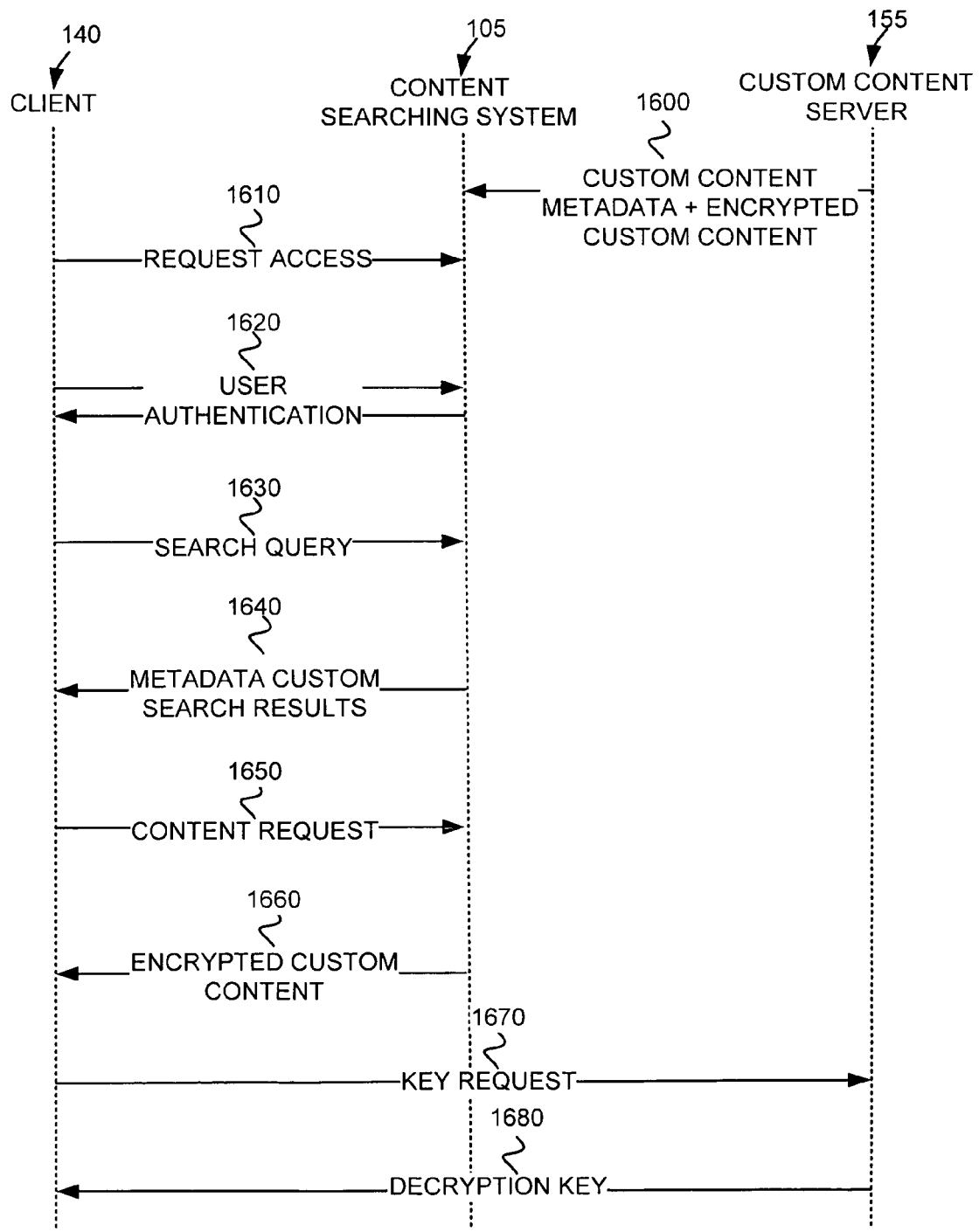
FIG. 16 is a diagram illustrating exemplary communications between a client, content searching system and a custom content server associated with the exemplary process of FIG. 15.

The exemplary process may begin with the receipt of a request from a user requesting access to specific custom content (block 1500). For example, the access request may include a log-in identifier and password supplied by the user as described above with respect to FIG. 11. FIG. 16 graphically illustrates a request for access 1610 being sent from client 140 to content searching system 105 to request access to custom content metadata 1600 previously provided by, for example, custom content server 155 to content searching system 105 along with encrypted custom content.

The requesting user may be authenticated (optional block 1510). Authentication unit 700 may authenticate the user using previously received access control data as previously described with respect to block 1005 of FIG. 10A. FIG. 16 graphically illustrates a user authentication process 1620 occurring between client 140 and content searching system 105.

A search query may be received from the user (block 1520). Custom search engine 620 may receive a search query from a user at a client 140 via network 310 as previously described with respect to block 1010 of FIG. 10A. FIG. 16 graphically illustrates the communication of a search query 1630 from client 140 to content searching system 105.

A custom search index(es) associated with the requested specific custom content may be searched based on the received search query (block 1530). For example, custom search engine 620 may search one or more custom search indexes 130-1 through 130-N associated with the specific custom content to which the user requested access, where the searched custom search indexes include indexed metadata that corresponds to custom content stored at custom content server 155.

Metadata custom search results may be provided to the user (block 1540). The metadata custom search results may identify portions of custom content metadata 115 previously provided to content searching system 105 for indexing. FIG. 16 graphically illustrates the communication 1640 of metadata custom search results from content searching system 105 to client 140.

A content request may be received from the user (block 1550). As shown in FIG. 16, a user at client 140 may, based on the received metadata custom search results 1640, send a content request 1660 to content searching system 105 requesting specific custom content. Encrypted custom content may be sent to the user that corresponds to the content request (block 1560). As shown in FIG. 16, content searching system 105 may send encrypted custom content 1660 to client 140. As additionally shown in FIG. 16, client 140 may send a key request 1670 to custom content server 155 to request a key that may be used to decrypt encrypted custom content 1660. Custom content server 155 may send a symmetric decryption key 1680 to client 140 in response to the request.

Exemplary Content Searching Process

Figure 17:
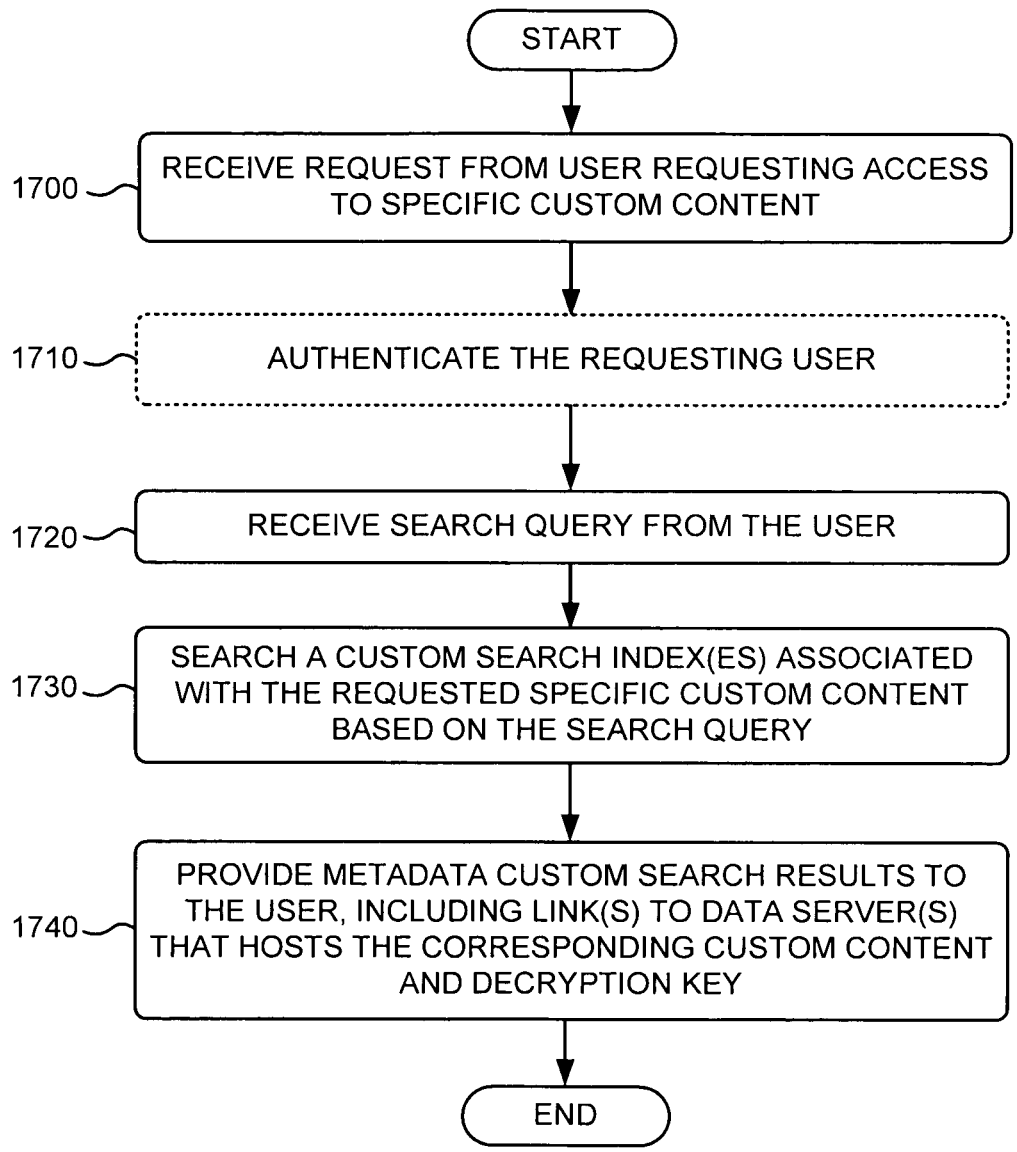
FIG. 17 is a flowchart of a process for searching one or more custom search indexes according to a third exemplary implementation.

FIG. 17 is a flowchart of a process for searching one or more custom search indexes produced, for example, using the exemplary process of FIG. 9, according to a third exemplary implementation. In the exemplary implementation of FIG. 17, content searching system 105 searches custom content metadata 115 and provides metadata search results and a decryption key to the searching user, and links to custom content server 155 where the custom content may be accessed by the user. The process exemplified by FIG. 17 may be performed by content searching system 105, possibly in conjunction with client 140 and custom content server 155.

Figure 18:
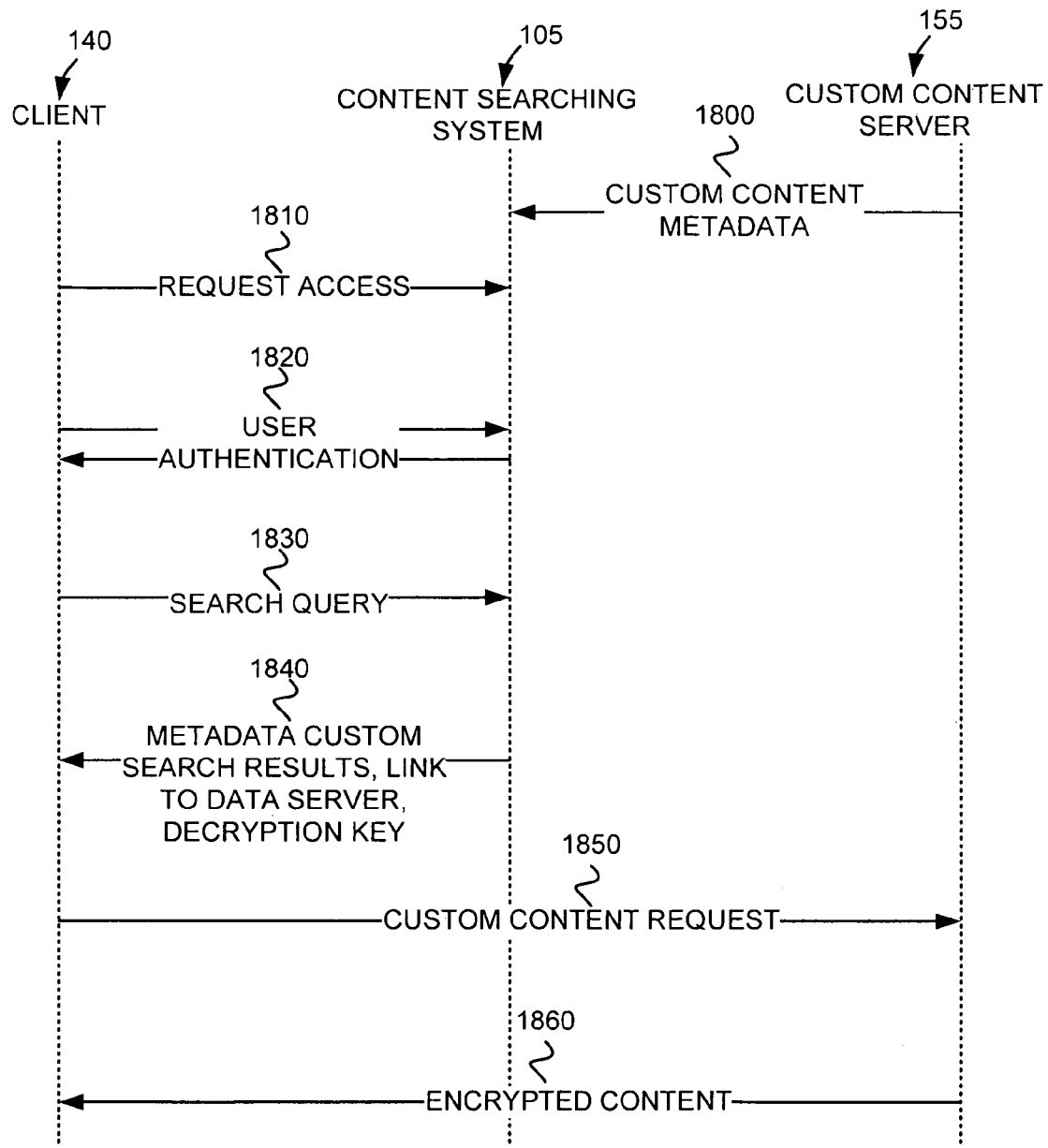
FIG. 18 is a diagram illustrating exemplary communications between a client, content searching system and a custom content server associated with the exemplary process of FIG. 17.

The exemplary process may begin with the receipt of a request from a user requesting access to specific custom content (block 1700). For example, the access request may include a log-in identifier and password supplied by the user as described above with respect to FIG. 11. FIG. 18 graphically illustrates a request for access 1810 being sent from client 140 to content searching system 105 to request access to custom content metadata 1800 previously provided by, for example, custom content server 155 to content searching system 105.

The requesting user may be authenticated (optional block 1710). Authentication unit 700 may authenticate the user using previously received access control data as previously described with respect to block 1005 of FIG. 10A. FIG. 18 graphically illustrates a user authentication process 1820 occurring between client 140 and content searching system 105.

A search query may be received from the user (block 1720). Custom search engine 620 may receive a search query from a user at a client 140 via network 310 as previously described with respect to block 1010 of FIG. 10A. FIG. 18 graphically illustrates the communication of a search query 1830 from client 140 to content searching system 105.

A custom search index(es) associated with the requested specific custom content may be searched based on the received search query (block 1730). For example, custom search engine 620 may search one or more custom search indexes 130-1 through 130-N associated with the specific custom content to which the user requested access, where the searched custom search indexes include indexed metadata that corresponds to custom content stored at custom content server 155.

Metadata custom search results may be provided to the user, including a link(s) to custom content server(s) 155 that hosts the corresponding custom content and a symmetric decryption key (block 1740). The metadata custom search results may identify portions of custom content metadata 115 previously provided to content searching system 105 for indexing. FIG. 18 graphically illustrates the communication 1840 of metadata custom search results, a link to custom content server 155, and a decryption key from content searching system 105 to client 140.

The link(s) provided by content searching system 105 may subsequently be used by client 140 to request custom content, which corresponds to results of the metadata custom search results selected by a user of client 140, stored at custom content server 155. As further illustrated in FIG. 18, client 140 may send a custom content request 1850 to custom content server 155 to request access to specific custom content. Custom content server 155 may send encrypted custom content, that corresponds to the requested content, to client 140. Client 140 may decrypt encrypted custom content 1860 using the symmetric decryption key previously received from content searching system 105.

Exemplary Content Searching Process

Figure 19:
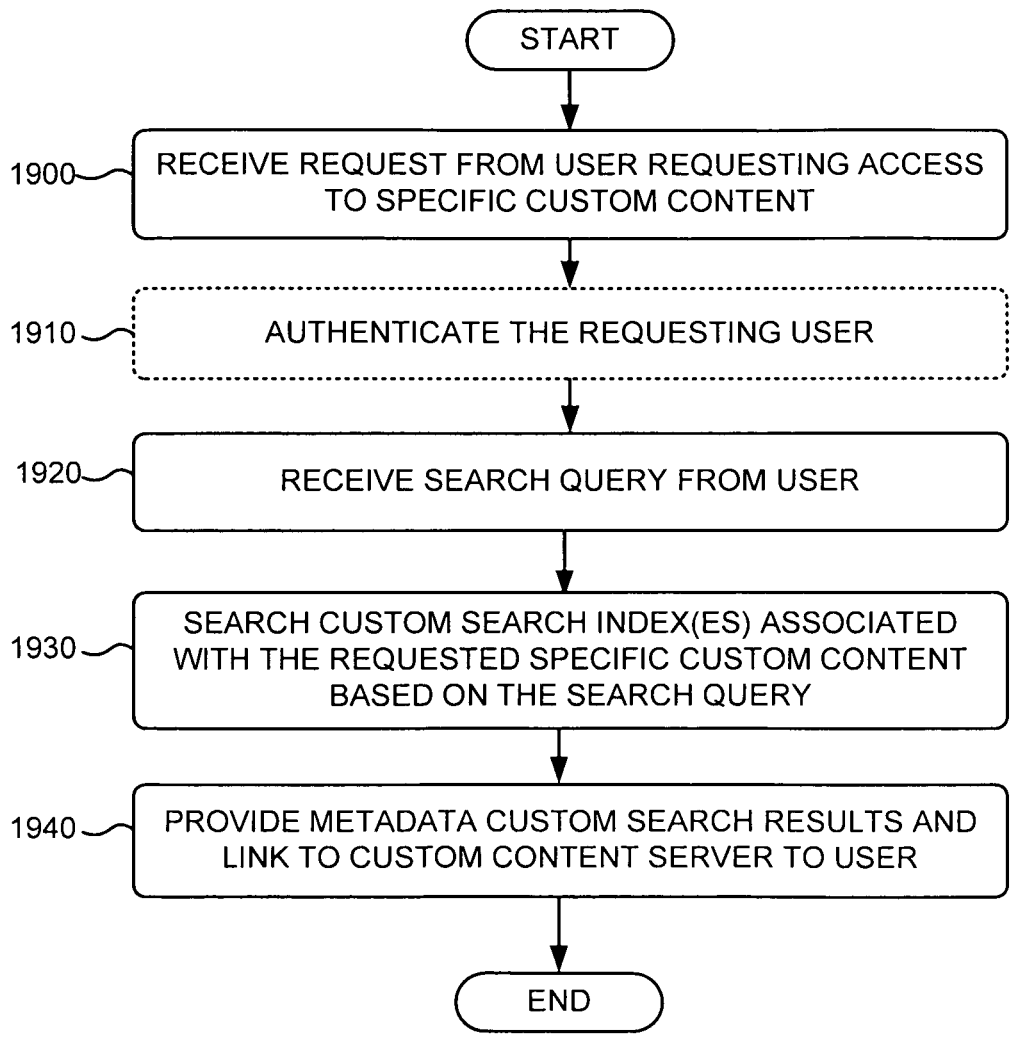
FIG. 19 is a flowchart of a process for searching one or more custom search indexes according to a fourth exemplary implementation.

FIG. 19 is a flowchart of a process for searching one or more custom search indexes produced, for example, using the exemplary process of FIG. 9, according to a fourth exemplary implementation. In the exemplary implementation of FIG. 19, content searching system 105 searches custom content metadata 115 and provides metadata search results to a searching user such that the user may obtain corresponding and encrypted custom content and a decryption key from custom content server 155 that stores the custom content. The process exemplified by FIG. 19 may be performed by content searching system 105, possibly in conjunction with client 140 and custom content server(s) 155.

Figure 20:
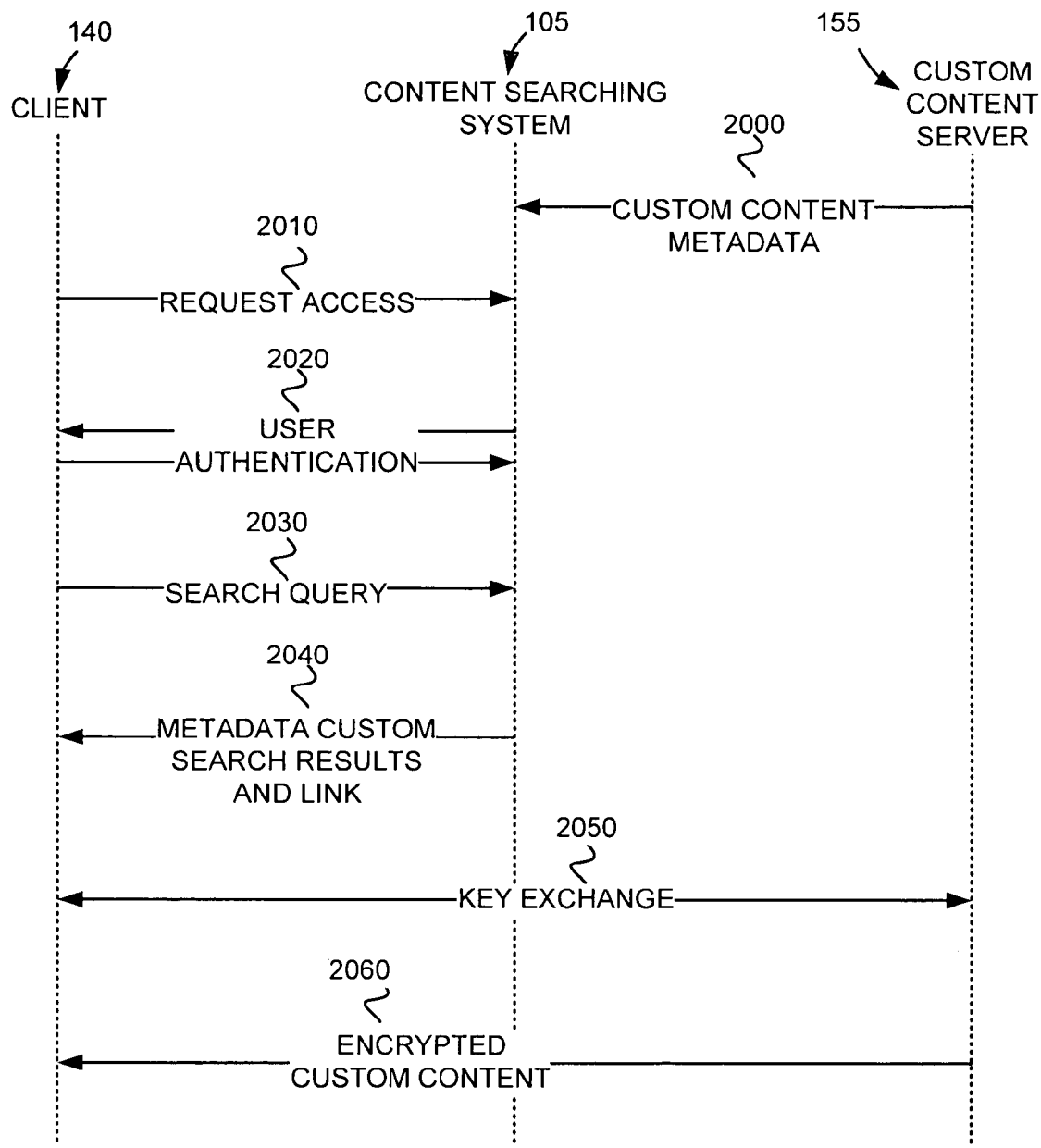
FIG. 20 is a diagram illustrating exemplary communications between a client, content searching system and a custom content server associated with the exemplary process of FIG. 19.

The exemplary process may begin with the receipt of a request from a user requesting access to specific custom content (block 1900). For example, the access request may include a log-in identifier and password supplied by the user as described above with respect to FIG. 11. FIG. 20 graphically illustrates a request for access 2010 being sent from client 140 to content searching system 105 to request access to custom content metadata previously provided by, for example, custom content server 155 to content searching system 105.

The requesting user may be authenticated (optional block 1910). Authentication unit 700 may authenticate the user using previously received access control data as previously described with respect to block 1005 of FIG. 10A. FIG. 20 graphically illustrates a user authentication process 2020 occurring between client 140 and content searching system 105.

A search query may be received from the user (block 1920). Content searching system 105 may receive a search query from a user at client 140 via network 310, as previously described with respect to block 1005 of FIG. 10A. FIG. 20 graphically illustrates the communication of a search query 2030 to content searching system 105.

A custom search index(es) associated with the requested specific custom content may be searched based on the received search query (block 1930). The custom search index(es) may include metadata that describes custom content stored at custom content server 155. Custom search engine 520 may search one or more custom search indexes 130-1 through 130-N associated with the specific custom content to which the user requested access, where the searched custom search indexes include indexed metadata that corresponds to encrypted custom content stored at content searching system 105. Metadata custom search results and a link to custom content server 155 may be provided to the user (block 1940). The metadata custom search results may be returned as results of the search of the custom search index(es). The metadata custom search results may identify respective portions of metadata previously provided to content searching system 105 for indexing. FIG. 20 graphically illustrates the communication of metadata custom search results 2040 from content searching system 105 to client 140. As further shown in FIG. 20, client 140 and custom content server 155 may subsequently engage in a key exchange 2050 such that client 140 may obtain the decryption key that can be used to decrypt encrypted custom content. Key exchange 2050 may include client 140 sending its public key to custom content server 155, and custom content server 155 sending its public key to client 140. Key exchange 2050 may also include an identification of custom content that the user at client 140 desires to access. Custom content server 155 may encrypt the requested custom content using its private key and client 140's public key. Custom content server 155 may then send encrypted custom content 2060 to client 140. Client 140 may decrypt encrypted custom content 2060 using client 140's private key and custom content server 155's public key.

CONCLUSION

Implementations described herein provide illustration and description, but are not intended to be exhaustive or to limit the invention to the precise form disclosed. Modifications and variations are possible in light of the above description, or may be acquired from practice of the invention. For example, while series of blocks have been described with regard to FIGS. 9, 10A, 10B, 15, 17 and 19, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of the aspects have been described without reference to the specific software code, it being understood that software and control hardware could be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a first device, user-selected metadata uploaded from a first client device,
      where the metadata includes data that describes encrypted data stored at a second device that is different from the first device;
   indexing, by the first device, the metadata to produce a metadata search index for the encrypted data;
   receiving, by the first device, a search query from a second client device;
   searching, by the first device, the metadata search index, based on the search query, to produce metadata search results associated with the encrypted data;
   identifying, by the first device and based on the search query, web content; and
   sending, by the first device, the web content, the metadata search results, and a link to the second device, to the second client device,
      where the link to the second device enables the second client device to access the encrypted data stored at the second device.

2. The method of claim 1, further comprising:
storing the metadata and the metadata search index at one or more databases that are remote from the first device.

3. The method of claim 1, further comprising:
authenticating the second user; and
where searching the metadata search index includes:
searching the metadata search index based on authenticating the second user.

4. The method of claim 1, further comprising:
encrypting the metadata search results; and
where sending the web content, the metadata search results, and the link includes:
sending the web content, the encrypted metadata search results, and the link to the second client device.

5. The method of claim 1, further comprising:
receiving access control data; and
associating the access control data with the metadata search index.

6. The method of claim 5, further comprising:
authenticating the second user based on the access control data,
the metadata search index being searched based on authenticating the second user.

7. The method of claim 1, further comprising:
providing, by the first device, a key for decrypting the encrypted data stored at the second device.

8. A system comprising:
a first device to:
receive user-selected metadata,
the metadata including data that describes encrypted data stored at a second device that is different from the first device,
index the metadata to produce a metadata search index for the encrypted data,
receive a search query from a client,
search the metadata search index, based on the search query, to produce metadata search results associated with the encrypted data,
identify, based on the search query, web content, and
provide the web content, the metadata search results, and a link to the second device to the client,
the link to the second device enables the client to access the encrypted data stored at the second device.

9. The system of claim 8, where the first device is further to:
store the metadata and metadata search index at one or more databases that are remote from the first device.

10. The system of claim 8, where the first device is further to:
authenticate the client, and
where, when searching the metadata search index, the first device is to:
search the metadata search index based on authenticating the client.

11. The system of claim 8, where the first device is further to:
encrypt the metadata search results, and
where, when sending the web content, the metadata search results, and the link, the first device is to:
send the web content, the encrypted metadata search results, and the link to the client.

12. The system of claim 8, where the first device is further to:
receive access control data, and
associate the access control data with the metadata search index.

13. The system of claim 12, where the first device is further to:
authenticate the client based on the access control data,
the metadata search index being searched based on authenticating the client.

14. The system of claim 8, where the first device is further to:
provide, to the client, a key for decrypting the encrypted data stored at the second device.

15. A non-transitory computer-readable medium storing instructions, the instructions comprising:
one or more instructions that, when executed by one or more processors of a first device, cause the one or more processors to:
receive user-selected metadata,
the metadata including data that describes encrypted data stored at a second device that is different from the first device,
index the metadata to produce a metadata search index for the encrypted data;
receive a search query from a client,
search the metadata search index, based on the search query, to produce metadata search results associated with the encrypted data,
identify, based on the search query, web content, and
provide the web content, the metadata search results, and a link to the second device to the client,
the link to the second device enables the client to access the encrypted data stored at the second device.

16. The non-transitory computer-readable medium of claim 15, where the instructions further comprise:
one or more instructions to store the metadata and metadata search index at one or more databases that are remote from the first device.

17. The non-transitory computer-readable medium of claim 15, where the instructions further comprise:
one or more instructions to authenticate the client, and
where the one or more instructions to search the metadata search index include:
one or more instructions to search the metadata search index based on authenticating the client.

18. The non-transitory computer-readable medium of claim 15, where the instructions further comprise:
one or more instructions to encrypt the metadata search results, and
where the one or more instructions to send the web content, the metadata search results, and the link include:
one or more instructions to send the web content, the encrypted metadata search results, and the link to the client.

19. The non-transitory computer-readable medium of claim 15, where the instructions further comprise:
one or more instructions to receive access control data,
one or more instructions to associate the access control data with the metadata search index, and
one or more instructions to authenticate the client based on the access control data,
the metadata search index being searched based on authenticating the client.

20. The non-transitory computer-readable medium of claim 15, where the instructions further comprise:
one or more instructions to provide, to the client, a key for decrypting the encrypted data stored at the second device.

\* \* \* \* \*